United States Patent
Paquier

(10) Patent No.: US 8,290,250 B2
(45) Date of Patent: *Oct. 16, 2012

(54) METHOD AND APPARATUS FOR CREATING A PATTERN RECOGNIZER

(75) Inventor: Williams J. F. Paquier, Toulouse (FR)

(73) Assignee: Five Apes, Inc., Palo Alto, CA (US)

( * ) Notice: Subject to any disclaimer, the term of this patent is extended or adjusted under 35 U.S.C. 154(b) by 872 days.

This patent is subject to a terminal disclaimer.

(21) Appl. No.: 12/344,347

(22) Filed: Dec. 26, 2008

(65) Prior Publication Data

US 2010/0166315 A1 Jul. 1, 2010

(51) Int. Cl.
*G06K 9/62* (2006.01)

(52) U.S. Cl. ........ 382/155; 382/156; 382/157; 382/158; 382/159; 382/160

(58) Field of Classification Search ............. 382/155, 382/156, 157, 158, 159, 160, 161, 224, 225, 382/226, 227, 228; 706/14–44; 128/925
See application file for complete search history.

(56) References Cited

U.S. PATENT DOCUMENTS

| | | | |
|---|---|---|---|
| 5,566,273 A * | 10/1996 | Huang et al. ............... 706/25 |
| 6,819,790 B2 * | 11/2004 | Suzuki et al. ............. 382/156 |
| 8,160,354 B2 | 4/2012 | Paquier | |
| 2003/0002731 A1 | 1/2003 | Wersing et al. | |
| 2003/0103668 A1 * | 6/2003 | Kondo et al. ............... 382/159 |
| 2005/0283450 A1 | 12/2005 | Matsugu et al. | |
| 2006/0204053 A1 * | 9/2006 | Mori et al. ............... 382/118 |
| 2008/0201282 A1 | 8/2008 | Garcia et al. | |

FOREIGN PATENT DOCUMENTS

| | | |
|---|---|---|
| JP | 10-021406 A | 1/1998 |
| JP | 2000-036047 A | 2/2000 |
| JP | 2001-034758 A | 2/2001 |
| JP | 2007-304771 A | 11/2007 |

OTHER PUBLICATIONS

Non-Final Office Action Mailed Jan. 18, 2012 in Co-Pending U.S. Appl. No. 12/344,344 of Paquier, W.J.F., filed Dec. 26, 2008.
International Search Report PCT/US2009/069061 dated Sep. 2, 2010, pp. 1-3.
Written Opinion PCT/US2009/069061 dated Sep. 2, 2010, pp. 1-3.
International Search Report PCT/US2009/069059 dated Jul. 28, 2010, pp. 1-3.
Written Opinion PCT/US2009/069059 dated Jul. 28, 2010, pp. 1-3.

(Continued)

*Primary Examiner* — Brian Le
(74) *Attorney, Agent, or Firm* — Perkins Coie LLP

(57) ABSTRACT

An image-based pattern recognizer and a method and apparatus for making such a pattern recognizer are disclosed. By employing positional coding, the meaning of any feature present in an image can be defined implicitly in space. The pattern recognizer can be a neural network including a plurality of stages of observers. The observers are configured to cooperate to identify the presence of features in the input image and to recognize a pattern in the input image based on the features. Each of the observers includes a plurality of neurons. The input image includes a plurality of units, and each of the observers is configured to generate a separate output set that includes zero or more coordinates of such units.

12 Claims, 23 Drawing Sheets

OTHER PUBLICATIONS

Rowley, H.A., et al., "Rotation Invariant Neural Network-Based Face Detection," Proc. of IEEE, Computer Society Conf. on Computer Vision and Pattern Recognition, pp. 38-44, Jun. 23-25, 1998.

Rowley, H.A., "Neural Network-Based Face Detection," IEEE Trans. on Pattern Analysis and Machine Intelligence, vol. 20, No. 1, pp. 23-38, Jan. 1998.

International Search Report PCT/US2009/069062 dated Jul. 29, 2010, pp. 1-3.

Written Opinion PCT/US2009/069062 dated Jul. 29, 2010, pp. 1-3.

Co-pending U.S. Appl. No. 12/344,344, filed Dec. 26, 2008.

Co-pending U.S. Appl. No. 12/344,346, filed Dec. 26, 2008.

Notice of Allowance Mailed May 3, 2012 in Co-Pending U.S. Appl. No. 12/344,344 of Paquier, W.J.F., filed Dec. 26, 2008.

Notice of Allowance Mailed Feb. 14, 2012 in Co-Pending U.S. Appl. No. 12/344,346 of Paquier, W.J.F., filed Dec. 26, 2008.

Co-pending U.S. Appl. No. 13/448,207 of Paquier, W.J.F., filed Apr. 16, 2012.

Restriction Requirement Mailed Dec. 1, 2011 in Co-Pending U.S. Appl. No. 12/344,344 of Paquier, W.J.F., filed Dec. 26, 2008.

Restriction Requirement Mailed Dec. 7, 2011 in Co-Pending U.S. Appl. No. 12/344,346 of Paquier, W.J.F., filed Dec. 26, 2008.

\* cited by examiner

Input pattern of Target Observer for projective integration
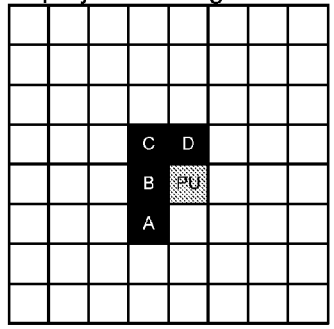
*FIG. 11A*
Receptive synaptic weight matrix of the pattern filter
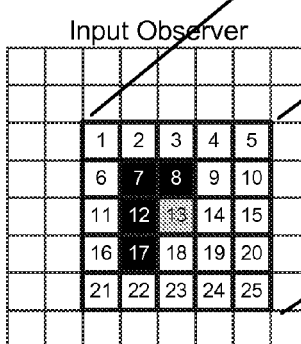
*FIG. 11B*
Projective synaptic weight matrix of the pattern filter
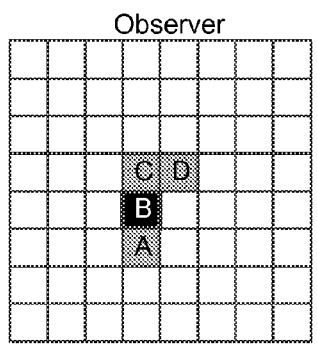
Projective scheme (Event driven propagation)

METHOD AND APPARATUS FOR CREATING A PATTERN RECOGNIZER

FIELD OF THE INVENTION

At least one embodiment of the present invention pertains to image-based pattern recognition, and more particularly, to an image-based pattern recognizer and a method and apparatus for creating such a pattern recognizer.

BACKGROUND

Pattern recognition is used in many different aspects of modern technology. For example, modern cameras can detect faces, and optical character recognition (OCR) and automatic speech recognition (ASR) are now relatively common. While the capabilities of sophistication of pattern recognizers are steadily improving, they still have significant limitations.

Images, or more generally, any natural patterns, contain an enormous amount of information. Unfortunately, that data is not easily exploitable. In particular, there is no known pattern recognizer that would allow the processing of images in the same way that we can now process words. For example, text indexing is done by searching occurrences of words (typically dictionary entries). Anytime an occurrence is found, its location is stored in a hash-table or other similar mechanism. The relation between raw data (text) and search patterns (character strings) is direct. The same is not true, however, of image-based pattern recognizers.

The classic approach in pattern recognition is based on a priori knowledge of the information to extract for each specific recognition task. Thus, the structure of the algorithm of the pattern recognizer normally contains explicit routines and variables to implement this recognition function. This requires long periods of research and development to develop a pattern recognizer specific for each individual recognition category, be it, OCR, ASR, faces, facial expressions, gestures, etc. This process is labor intensive and increases the cost of resulting applications.

SUMMARY

Introduced here are an image-based pattern recognizer and a method and apparatus for making such a pattern recognizer. The techniques introduced here eliminate the need for a long research and development period associated with making a pattern recognizer. By employing positional coding, the meaning of any feature present in an image can be defined implicitly in space. The pattern recognizer algorithms contain no explicit references to the problem to be solved or the pattern(s) to be extracted, thus providing a generic pattern recognizer that can be customized by a user (e.g., an application developer) to recognize any of various different types of patterns for any of various different types of applications. In effect, a pattern recognizer such as introduced here forms a building block from which many different types of application-specific pattern recognizers can be built.

In certain embodiments, a pattern recognizer according to the techniques introduced here is in the form of a neural network. The neural network includes a plurality of processing elements called observers coupled in a multi-stage neural network, through which an input image is processed, where each stage includes at least one (though typically two or more) observer. The network of observers are configured to cooperate to identify the presence of features in the input image and to recognize a pattern in the input image based on the features. Each of the observers includes a plurality of neurons. The input image includes a plurality of units, and each of the observers is configured to generate a separate output set that includes zero or more coordinates of such units.

At least two of the observers in a pattern recognizer are each configured to generate its own output set by: 1) integrating a corresponding potential intensity over a range of time slices, for each coordinate in the output set of an upstream (afferent) observer, and 2) for each unit of the input image whose potential exceeds a threshold after integration by the observer, including the coordinate of the unit in the output set. The presence of a coordinate in the output set of an observer represents recognition of a particular type of pattern in the input image, at a position corresponding to that coordinate. Coordinates listed in the output set up an observer are ranked based on potential.

In certain embodiments, an output list of an observer is organized into a plurality of "time slices", with each set of coordinates in the list being binned into a time slice according to the potential of the corresponding output at that location (highest intensity first). This produces a ranked list of coordinates, where they coordinates are ranked by potential, for use in the integration process by downstream (efferent) observers.

In certain embodiments, the neural network further includes a plurality of pattern filters, each of which includes a weight matrix (or multiple weight matrices) including a plurality of weight values. The observers are configured to use the weight values in integrating corresponding potentials of units of the input image. Observers are further configured to apply a modulation factor to the weight values during integration, to decode the rankings in the output sets of upstream observers.

Positional coding is employed in the techniques introduced here, in at least two ways: First, the type of pattern that any particular observer recognizes is based on the position of that observer within the neural network. Second, the positional coding also is employed within the observer themselves. Specifically, if two neurons belong to the same observer, these two neurons will code for the same type of pattern, but at different positions in space. The firing of any particular neuron indicates the presence of a category (type) of patterns in the input image. Conversely, the non-firing of neuron can also be important, in that it represent a placeholder in the positional coding paradigm, like a zero in positional coding system for numbers. Non-firing events allow the creation of patterns for downstream observers which observe this pattern. The output of each neuron is observed by a downstream observer only if that output represents a detected event. This is in contrast with, and much more efficient than, conventional integrate-and-fire type neural networks, in which downstream elements scan all upstream neurons to identify those that have fired.

Also introduced here is a technique of creating a pattern recognizer. In certain embodiments, the observers are identical generic elements, i.e., they are not specific to any particular pattern or pattern type. In certain embodiments, observers are implemented as software. Any of various conventional programming languages can be used to implement observers and the supporting framework, including C, Objective-C, C++, or a combination thereof. In other embodiments, observers and/or other elements of the system may be implemented in hardware, such as in one or more application specific integrated circuits (ASICS), programmable logic devices (PLDs), microcontrollers, etc.

Implementing observers as identical generic elements enables the interactive creation of a special-purpose pattern recognizer by a user (e.g., an application developer) without the user having to write any code, i.e., by appropriately adding these observers into a neural network of observers and "teaching" the observers through appropriate user input. A user can add an observer to a network or teach an observer by using standard image editing selection tools, as described below.

In certain embodiments, a method of creating a pattern recognizer includes using a first plurality of observers in a network of observers, to identify a plurality of units of an input image that represent a feature, and using a second plurality of observers in the network to attempt to recognize, in the input image, a pattern from each of a plurality of pattern types, based on outputs of the first plurality of observers, each observer of the second plurality of observers is configured to recognize a different type of pattern. The method further includes adding a new observer to the network of observers, to recognize a new pattern based on output of at least one observer of the second plurality of observers.

In another aspect, the method includes adding a new observer to a network of observers, including a plurality of observers operatively coupled to each other in successive stages, where each stage includes at least two observers, and each observer is configured to produce an output in response to recognizing a different type of pattern in an input image. The method further includes configuring the new observer to recognize a pattern in the input image based on output of at least one observer of the plurality of observers.

With the techniques introduced here, a finite set of algorithms and method to store implicitly the meaning of data in position (e.g. addresses in memory) allow the creation of any pattern representing concrete objects or signals in images, video and sound. This enables dealing with images, video and audio and doing the kind of things we easily do with text today, such as indexing, comparing, sorting, selecting, searching, replacing, correcting, changing style, triggering actions, etc.

Other aspects of the techniques introduced here will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 11A and 11B illustrate an example of the use of receptive and projective synaptic weight matrices in integration of neurons in an observer;

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
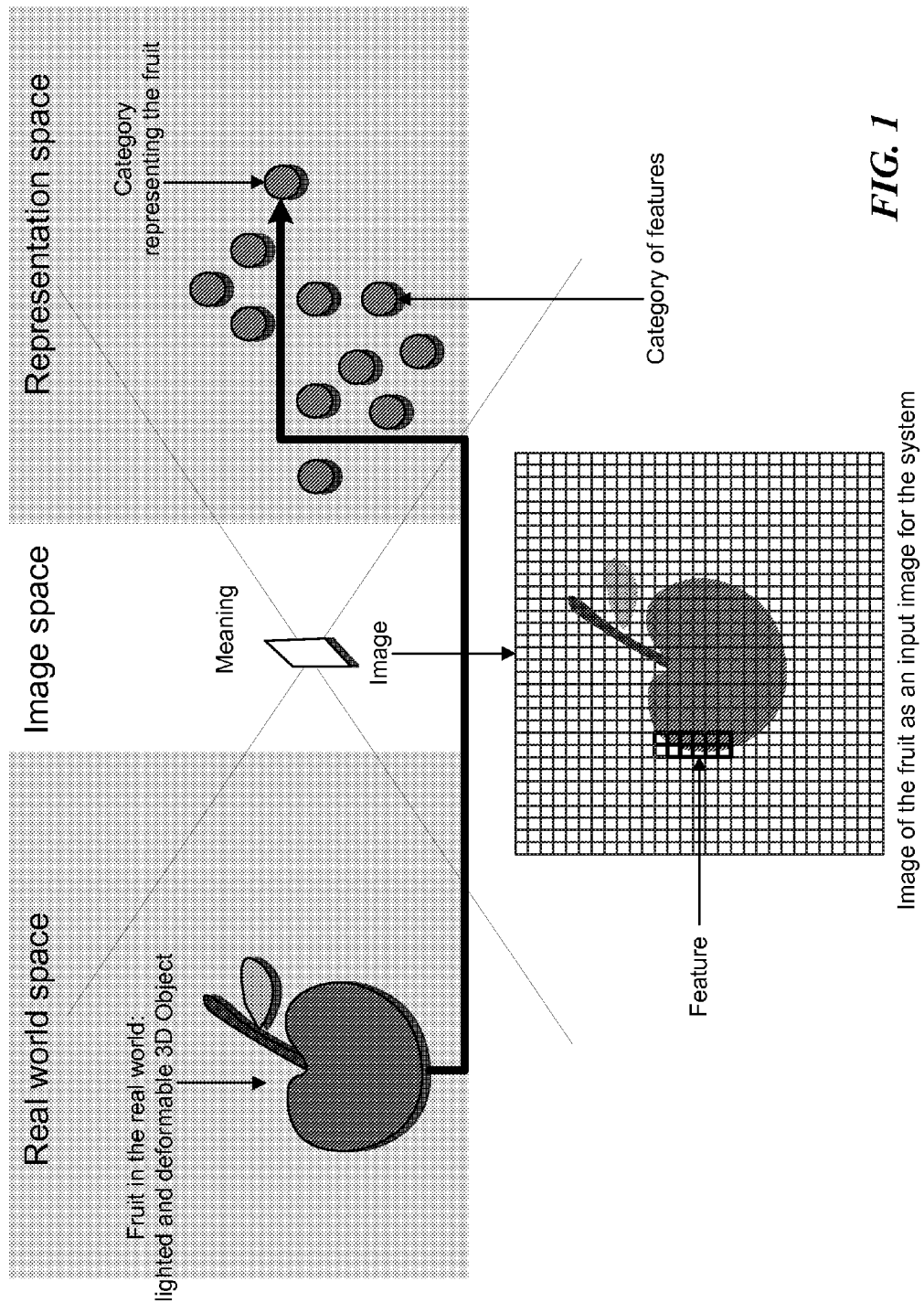
FIG. 1 illustrates is a conceptual illustration of principles of pattern recognition in accordance with the techniques introduced here.

FIG. 1 illustrates the general principle behind the method of finding a pattern in an image according to the techniques introduced here. On the left side of the figure is the real world space, and on the right side is the image space (acquired image of the real world) and a representation space which contains categories representing features in images.

An objective of the technique introduced here is to use positional coding to completely disambiguate the relationship between an object 11 in the real world and a category 12 representing that object. Before discussing the technique further, it is useful to discuss certain concepts, such as the concepts of object, image, feature, category and meaning.

Object: Objects in the real world can be fully observable or partially observable, depending on the nature of the space. If the input space is the real world, visual objects are lighted and deformable 3D objects not fully observable in a single image. If the input is a 2D space with drawings, letters or numbers, the objects are 2D drawings fully observable in a single image. If the input space is a spectrogram of real world sound, objects are words and sounds and are fully observable but potentially superimposable (example: several people speaking at the same time).

Image: Images have an important property: They are matrixes of pixels, where (in the case of color images) each pixel can take any of several colors. Images therefore have a positional coding property. As in the well-known LEGO game, pixels in an image are like bricks: Depending on their color and relative position to other pixels, they will create images containing an interpretable meaning. As in positional coding, the notion of 'zero' as a place holder is used for creating spatial structures.

Feature: A feature, as the term is used herein, it is set of one or more spatially organized pixels. An example feature 13 is shown in FIG. 1. Features are defined in the image space. Pixels and features can potentially have billions of meanings (just as LEGO bricks can potentially be used in billions of constructions).

Category: Categories are organized into a network of observers. The elementary categories are sets of features (which themselves are sets of pixels), while higher level categories are sets of more elementary categories. Referring again to FIG. 1, one could have, for example, categories of local orientations, then categories of curves based on categories of local orientations, then round shapes based on the categories of curves, resulting in a category of this particular fruit. Reference is made to "categories" because the intent is to encode all the potential images of this kind of fruit in that category, and of course fruit images which have never been seen before (generalization capacity).

The higher one goes in the network of categories (i.e., the farther from the input of the network), the less potential there is for meaning for categories in the real world, because at each stage of the network we add constraints which decrease the potential categories. At the output of the network, we have categories which reflect a totally disambiguated representation of objects in the real world.

Categories, as the term is used herein, include the notion of positional coding, as discussed further below. Specifically, the activation (firing) of a neuron (processing unit) reflects the presence of a category of patterns in the input image at the coordinate of the activated neuron. Note that the terms "processing unit" and "neuron" are synonymous and are used interchangeably in this description. A neuron can fire anytime its potential passes its threshold. This means that several features similar to each other are able to make the neuron fire. Consequently, it means that the neuron represents multiple similar patterns, i.e., category of patterns, in the input image.

In other words, an observer in the network literally observes proximally its upstream input patterns and distally is able to recognize a category of patterns in the input image. For example, if an observer has been trained to recognize faces, it will code for a category of patterns representing faces. Ideally, any time a face is presented in an input image, some neurons in the Observer will fire.

Meaning: Meaning is the unique relationship between a real object and a category representing the object in the real world. An objective of the method is to use the position coding algorithm detailed below to totally disambiguate the relationship between an object in the real world and a category representing this object.

Overall Approach

Figure 2:
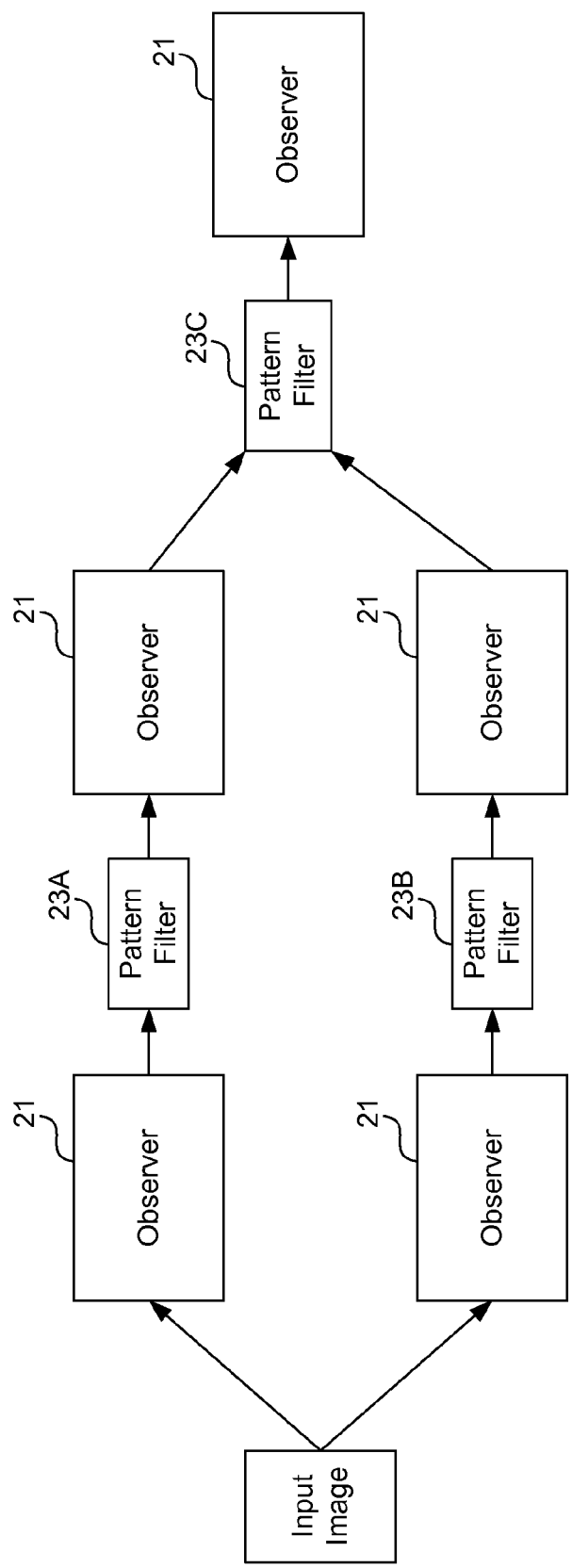
FIG. 2 illustrates a simple example of a network of observers.

A pattern recognizer, according to certain embodiments of the invention, is a runtime neural network of observers. Observers instantiate categories such as defined above. The neural network has multiple stages, or layers, through which an input image is processed, where each stage includes at least one observer (typically a stage contains two or more observers). FIG. 2 illustrates a very simple example of such a network, which contains five observers 21 and three pattern filters 23A, 23B and 23C.

Certain embodiments use a spiking network model, rank order coding and event driven approach, as described further below. Note, however, that at no point does the technique introduce any algorithmic element that breaks the positional coding property.

Once instantiated by the observer engine, observers are connected through pattern filters to other observers. A pattern filter is a set of weight values which make a generic observer recognize a particular pattern. Each observer, combined with its immediately upstream pattern filter, is executed on a set of input patterns and produces a new pattern as an output. Thus, an observer is seen as a pattern by other, downstream observers.

As the outputs of observers are patterns, they constitute ideal input for higher level (i.e., downstream) observers. As such, a face detector can be created on top of a left eye, right eye and nose detector, by chaining together observers with their respective pattern filters.

Figure 3:
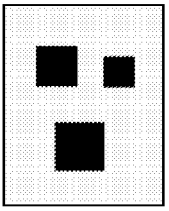
FIG. 3 illustrates examples of various input and output patterns for multiple stages of observers in a network.

Each pattern filter extracts a particular aspect of the input pattern. Referring now to the example of FIG. 3, where input patterns comprise positive and negative contrasts of the same input image, an example of the outputs of various stages of observers in a network is shown.

Observers and pattern filters can be chained in a network. For example, processing images with four different types of filters corresponding to upper left, upper right, lower right, lower left corners, will produce four pattern images, each extracting the presence of a different kind of corner, then on top of these four patterns, another pattern filter can then easily extract any kind of quadrangle.

The more processing power is available, the more patterns in images can be filtered. Note that the creation of filters relies on learning rules and does not require writing code by the user. The user can create a new observer in the network in order to recognize a new pattern. The user can also teach an existing observer (through examples or counter-examples) to improve its recognition accuracy.

The user does not have to create pattern filters manually. A pattern filter is automatically and almost instantaneously created by the system (describe below), when the user so desires, by using a user selection in the input image as a starting pattern. This user selection sets the weight values in the pattern filter, as described below. One engine cycle later, the immediately downstream observer from the pattern filter starts to provide an output list according to that pattern. The selected pattern gets the best matching level in the output list, but patterns which resemble the selection are also detected.

At this point the user has defined a category which contains a single example. However, this may not be sufficient to clearly define a frontier between what the user wants in the category and what the user wants to exclude. Consequently, any subsequent selections of other positive or negative samples (through the observer teaching/learning process described below) will refine the observer category definition.

User choice defines junctions in category definition. For example, if an observer is configured (by its upstream pattern filter) to recognize a face, adding other faces to the category will eventually build a generic face observer. On the other hand, excluding other faces while adding other photos of the same person will build a recognizer for that particular face.

In a practical application, the output detection list of the neural network can be used to trigger or perform any of various actions, such as indexing, comparing, sorting, selecting, searching, replacing, correcting, changing style, triggering an action, etc. for example, the output detection list of the network can be used to allow one to:

associate an image with a textual tag and to retrieve the image with a textual search later.

compare several aspects of the same object (e.g., mouth with smile vs. mouth with no smile, red eyes vs. non red eyes).

sort images by textual tag or by any attribute of the table of content.

select a portion of an image for a copy-and-paste or—treat that portion as a URL.

search for any image which looks like the current detection or search for images which have the same tag as the current tag.

process an image compositing to replace a part of an image with another image (for example, a closed eye in a photo with an open eye of the same person).

apply corrections, such as remove a pimple in real time in a video conference.

change a style, such as allow application of a 3D deformation on a face.

allow one to connect detection with predefined actions, such as play and pause music, switch applications, turn the page of a multipage document, scroll in a document, etc.

apply a special effect to an image that the position of the detection.

control mouse movement or movements of other user input devices determine which functions are assigned to various user-interface devices The following is a practical example of how a pattern recognizer of the type introduced here can be used to develop a primitive for a video game. Consider an end user in front of a camera, and a network which includes two observers. The first observer is configured (by its pattern recognizer) to recognize an opened left hand and the second observer is configured to recognized a closed left hand. The video game primitive in this example is for the user's closing the left hand in front of the camera for a minimum amount of time to be able to create a "fireball" when he subsequently opens his left hand. Accordingly, the process can be modeled as follows: If the closed left hand is recognized, then a timer is launched and an deformation effect reduce the closed left hand in the output video. If the opened left hand is recognized and the timer has reached a threshold of time then a fireball effect is added on top of the opened left hand in the output video.

Both observers (the one for the opened left hand and the one for the closed left hand) are created and taught by an application developer during the game's development.

System Architecture

Figure 4:
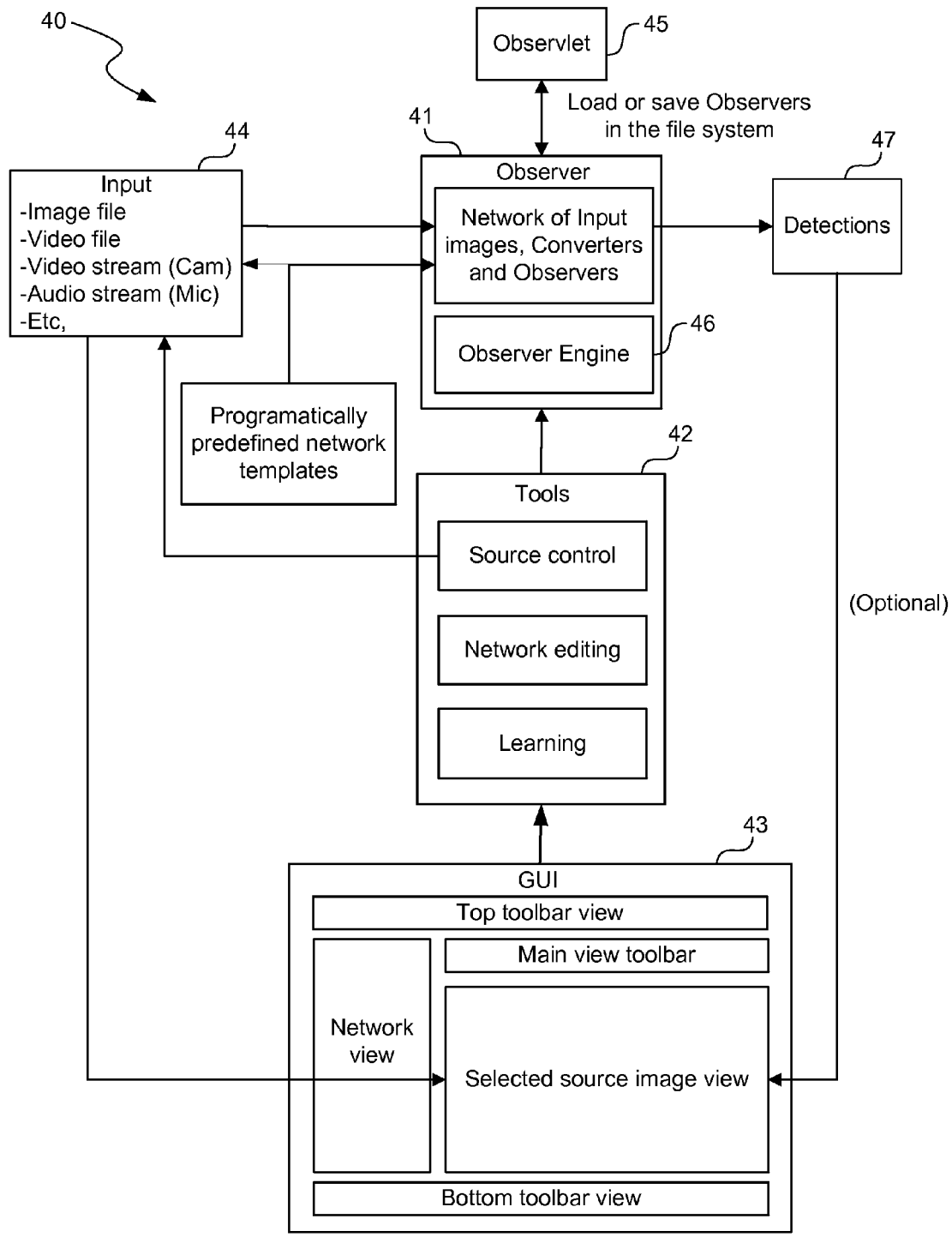
FIG. 4 is a block diagram of an architecture of a system for operating a pattern processor according to the techniques introduced here.

Refer now to FIG. 4, which shows the general architecture of a system for operating a pattern processor such as introduced here. In the illustrated embodiment, the system 40 includes a set of observers 41, a tools module 42 containing a set of tools, and a graphical user interface (GUI) 43. Note the typical pattern recognizer includes multiple observers 41, however only one is shown in FIG. 4, to simplify explanation. In certain embodiments, these illustrated elements of the system are implemented at least partially as software and/or firmware that executes on one or more programmable processors. In other embodiments, the system may be implemented entirely in special-purpose hardware (e.g., ASICs, PLDs, etc).

Each observer 41 receives some form of input media 44, such as an image or a streaming media file, processes it, and then generates a list of detections. An observer 40 may be from a predefined neural network template, although that is not necessarily the case. Each observer 40 provides two outputs (which are the same information in different representations: an output list and a visual pattern of indicators centered on the elements in the output list.

In certain embodiments an observer 40 is a software generated object instantiated at run-time by an observer engine 46, where the observer 40 is defined by an entity called an observlet 45. An observlet 45 is a document for use by the observer engine 46 and may be, for example, an extensible markup language (XML) flat file. An observlet 45 contains a pattern description in a simpler pattern base, i.e., it contains the pattern filter for an observer. This pattern description defines a category of equivalent patterns. Observlets 45 can be created somewhere and used somewhere else. They can be uploaded on servers, shared by users, etc.

The observer engine 46 includes a finite set of routines which are common to any pattern description. An observlet 45 running on top of the observer engine 46 forms an observer 40, which can recognize a pattern. When an observlet 45 is loaded by the observer engine 46, it becomes a computational function which produces a detection list 47 of the pattern description it represents. Anytime a part of the input media 44 matches the observlet pattern description, a new element is added to the detection list 47. Of course, if the input media 44 does not contain the pattern defined by the observlet 45, the output list 47 for that image is void.

The observer engine 46 has asynchronous mode and an asynchronous mode. The synchronous mode is used for input which produces a stream of images (e.g., webcam, microphone) and provides an output list of detections for all running observlets at the same rate as that at which the input device acquires images. The asynchronous mode is used for batch processes.

The category for an observlet 45 is defined by defining the frontiers of what is in and what is not in the category. To do that the user provides a set of positive samples (part of input media) for what is in and a set of negative for what is out. These samples can be created by using classical GUI selection tools. Consequently, anyone who knows how to use simple image processing software is a potential observer developer.

In general, the GUI 43 and tools 42 provide various input/output (I/O) services, such as loading, creating and saving observlets; loading input media (e.g., image files, video files); connecting to a media stream (e.g., from webcam or microphone); image creation with brush tools (e.g., palette, mouse, touch screen); and creation of an observer network. In one embodiment, the GUI 43 provides a main window divided into a top toolbar, a network view of the currently loaded neural network on the side, a main view and a bottom toolbar view at the bottom.

The input media 44 is also displayed to the user via the GUI 43. Through the GUI 43, the user (e.g., an application developer) can perform various functions, such as controlling the input source (e.g., turning on and off acquisition of stream sources), editing the neural network (e.g., adding a new observer, deleting an observer or a group of selected observers, modifying observer parameters), teaching/learning of observers.

The list of detections 47 is also displayed to the user via the GUI 43. For each selected observer, detections are extracted and so that only coordinates representing maximums of local clusters of detections are kept. The detections can be superimposed on the input image as displayed to the user. For example, features in the input image which are represented in the detection list may be highlighted, outlined, or otherwise identified, in the image as displayed to the user on the GUI 43. The detection list may also be displayed in the form of a table or other structured representation and/or may be used to trigger any of various actions, as described above.

Note that a pattern can be covered by several distinct observlets. This property constitutes a significant advantage over other pattern recognition techniques. For example, if one has a face observlet, a smile observlet, a glasses observlet, and a bear observlet, each of these recognizers can be made active by the same pattern if the pattern contains all of these properties. This capacity is extremely useful for search, sort and browse functions.

Overall Operation

The overall operation of a pattern recognizer will now be described.

Figure 5:
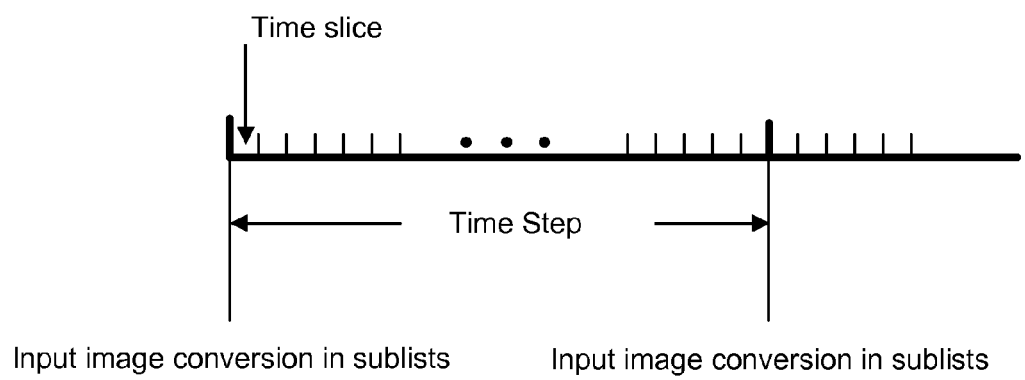
FIG. 5 illustrates the relationship between time steps and time slices.

Time: The pattern recognizer uses discrete time to acquire new images and processes each observer during every new cycle in case of streaming input (e.g., video or audio), or propagates information across the network of observers once in the case of a static input image. A time cycle (also called time step) is divided into n time slices as shown in FIG. 5. Each time step is a real time increment which corresponds to a new input image acquisition. Time slices are used to implement rank order coding and decoding, as discussed further below. Time slices reflect the rank order of events, and thus the relative time between events. Integration in each time step is done time slice by time slice.

Network Input: The input of the pattern processor is one or more images. Videos or spectrograms for sounds are converted into images at each runtime cycle. Images are inherently positional coding ready, as discussed above.

Network Output: The output of the network (pattern recognizer) is a detection list, which is generated from the output lists of the final stage observer(s). Each element of a detection list contains a reference to the observer which generated that element, the spatial (x,y) coordinate, matching level, size and other information about of a matching feature in the input image.

Figure 6:
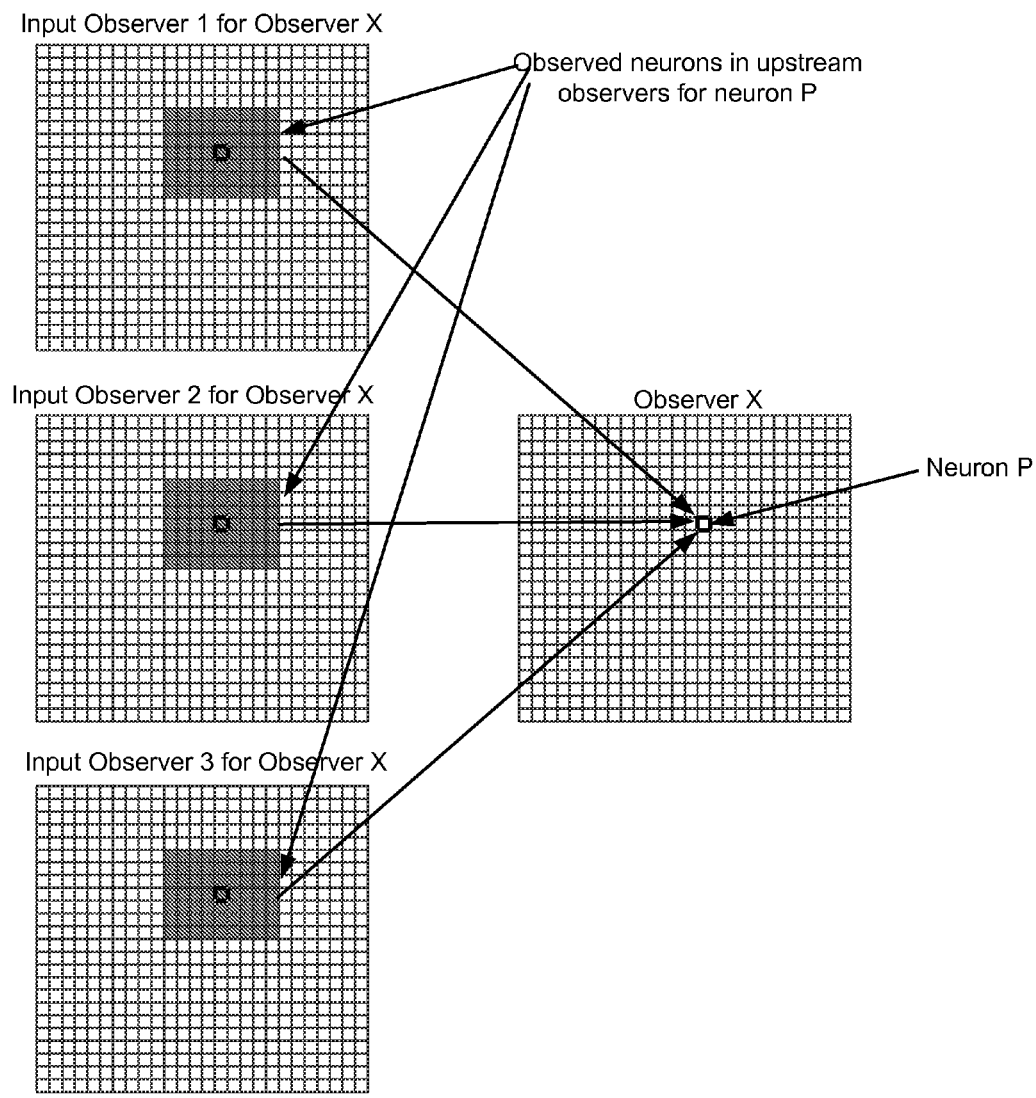
FIG. 6 illustrates the relationship between a neuron in a given observer and neurons in upstream observers.

Observers: Each observer comprises a 2D array of processing units (e.g., categories), called neurons, as shown in FIG. 6. These neurons are described below. Each 2D array maps to the geometry of the input image, but can have a smaller scale (i.e., where a neuron covers several neighboring pixels) or can be translated relative to the input image (i.e., where a processing unit covers shifted pixels) or both (translation and different scale at the same time). Observer output is computed during each time slice, each output state is both a pattern (and has the same position coding property of the input image) and a list of the firing neurons during the previous time slice.

There are two types of observers: ordinary observers and converters. Converters and ordinary observers have the same type of output but not the same input. Converters process an input image (2D array of pixels) and convert it into ordered lists (output lists) of coordinates. Ordinary observers process output lists of converters or other (upstream) observers and generate ordered output lists of coordinates.

Neurons (Processing Units): The neural network described herein uses a custom model of integrate-and-fire neurons, also known as spiking neurons. Each neuron is modeled with a potential, a threshold and a modulation factor used for the rank order decoding. The output of a neuron is a pulse (or spike), i.e., a coordinate associated with the time slice when the potential passed the threshold or nothing if the potential does not pass the threshold. Each observer's (2D array of processing units) global output can be seen as a dynamic pattern. In the positional coding scheme, no output or zero output are each important pieces of information. A processing unit is a placeholder that provides an observable pattern to downstream observers, so that positional coding remains intact.

Converters: The first stage in the pattern recognizer is a special class of observers called contrast converters, or simply "converters". The converters extract positive and negative contrast (e.g., quantified variation of luminance) in the input image and apply these values (called "potentials") to a threshold to determine which pixels in the input image show a significant amount of contrast. The reason for extracting contrasts first is due to the need to localize variations in the image. Uniform (same luminance) areas are less informative than local variations of luminance. The convolution kernel is build to search such variations in any directions.

In essence, therefore, the function of the converters is to identify the locations of features in the input image. By contrast, downstream observers in the pattern recognizer actually recognize the identified features, i.e., associate them with one or more categories.

Figure 7:
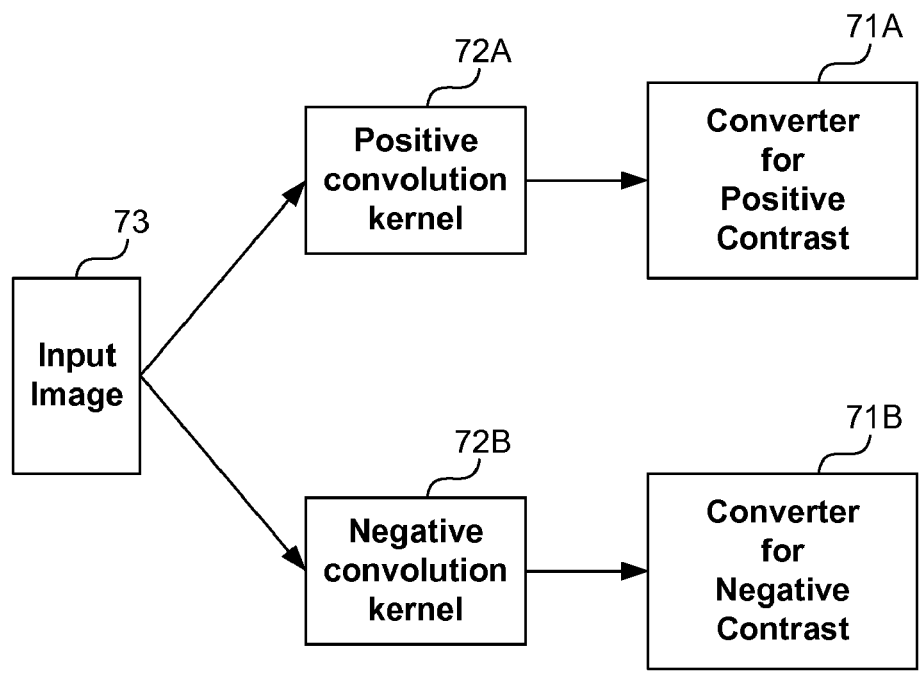
FIG. 7 illustrates the use of positive and negative contrast converters in a network of observers.

As shown in FIG. 7, one converter 71A extracts positive contrast while a separate converter 71B extracts data contrast. In certain embodiments, each converter does this by convolving the input with a Mexican Hat shaped convolution kernel matrix, such as a Laplacian of Gaussian (LoG) or difference of Gaussian. These convolutions are computed and stored in a data structure which has the same structure and output as observers, as discussed further below. Results are thresholded to only keep positive results, due to the rank order coding, as discussed further below. Positive and negative contrasts are processed in this way, because in spiking neurons, the exchanged information is positive pulses or spikes; consequently, negative contrasts have to be encoded separately (e.g., in a different space in the position coding scheme) to convey a different meaning. A single converter does not allow coding for both positive and negative values. Consequently, the extraction of positive and negative contrasts is separated into two different converters. Each converter 71A or 71B convolves the input image 73 with a specific convolution kernel matrix, 72A or 72B, reflecting the extraction of a positive or a negative contrast. The nature of the contrast is therefore implicitly encoded in the position of the output list (in the network of observers).

As a consequence of this positional coding, all elements of the output list form a converter filtering the image with the convolution kernel corresponding to the positive convolution will code for positive contrasts. All elements of the output list coming form the converter filtering the image with the convolution kernel corresponding to the negative convolution will code for negative contrasts.

Figure 8:
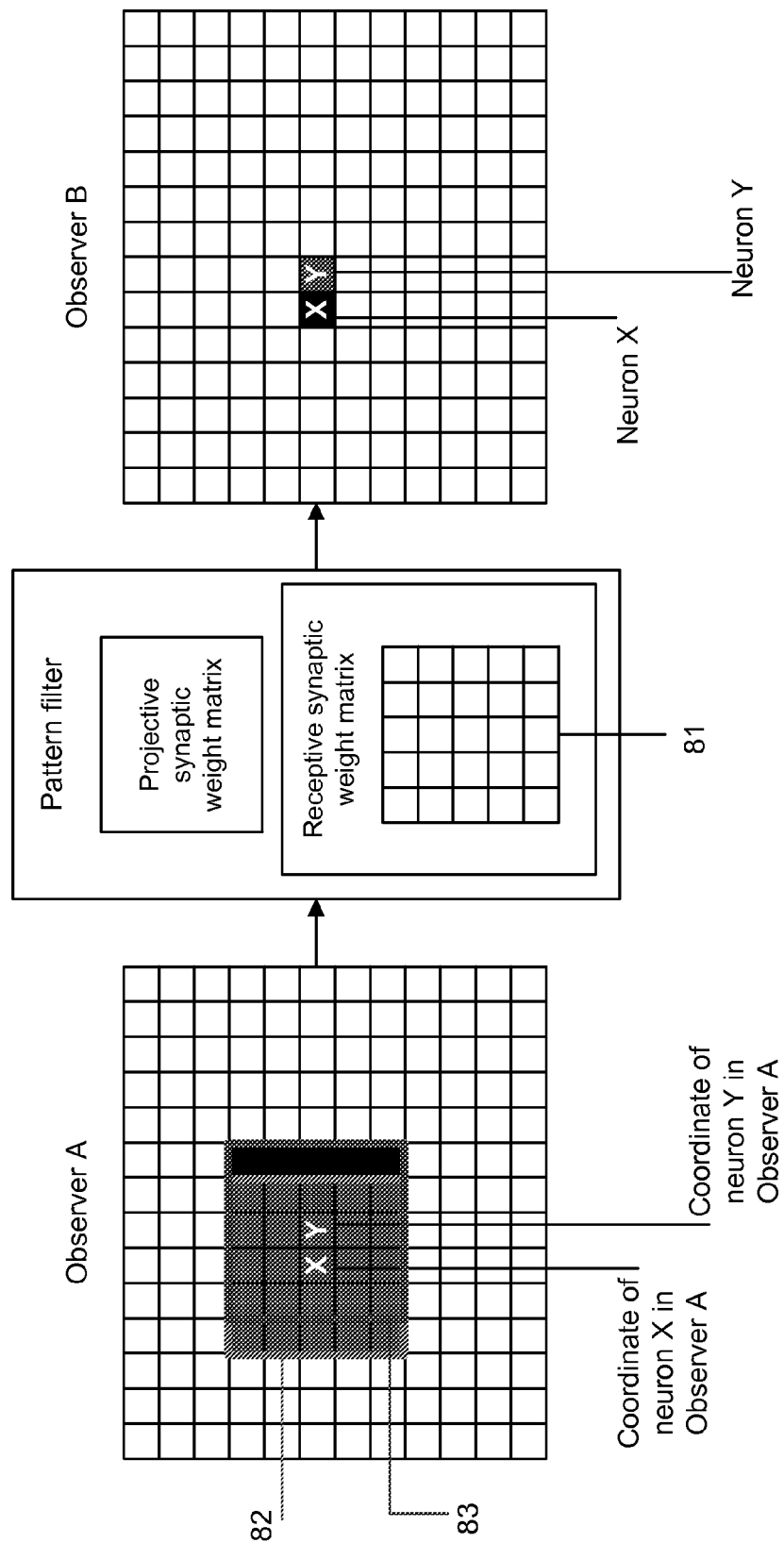
FIG. 8 schematically illustrates the connectivity between successive stages of observers in a network, by use of a pattern filter containing synaptic weight matrices.

Connectivity: Each neuron (processing unit) in each observer can be functionally connected to a contiguous and rectangular array of other neurons in an upstream observer, as shown in FIG. 8. In this scheme each neuron link is represented by a synaptic weight. Therefore, each contiguous rectangle of neurons defines a synaptic weight matrix, which is part of a pattern filter 82. A separate pattern filter is defined between every pair of connected observers that are in different but adjacent stages of the neural network. In FIG. 8, reference numeral 82 denotes the array of neurons in observer A that are observed by neuron X in observer B, through its corresponding synaptic weight in the receptive synaptic weight matrix 81. Reference numeral 83 denotes the array of neurons in observer A that are observed by neuron Y in observer B, through its corresponding synaptic weight in the receptive synaptic weight matrix 81.

Figure 9:
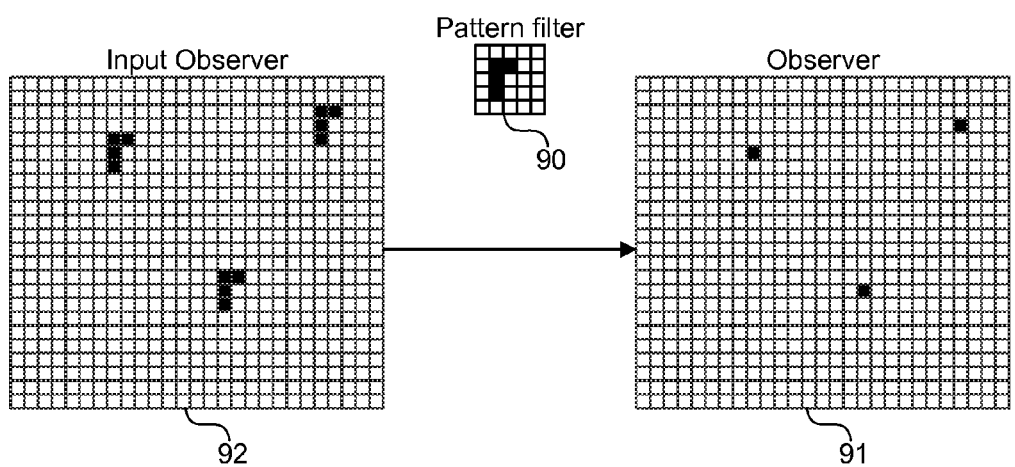
FIG. 9 shows an example of the relationship between the outputs of two observers with a given pattern filter between them.

Pattern filters and Synaptic Weights: A pattern filter 82 is a pair of synaptic weight matrices, i.e., one projective weight matrix 80 and one receptive weight matrix 81, which forms a link between two observers in the neural network, as illustrated in FIGS. 8 and 9. Each synaptic weight matrix is an N×P matrix of real numbers, i.e., weight values. The "owner" of a pattern filter is the immediately downstream observer to which that pattern filter is connected. The main purpose of a pattern filter is to allow integration of a signal coming from the ordered output list of the upstream observer connected to the pattern filter, by the downstream observer connected to the pattern filter, using the projective synaptic weights in the pattern filter. A secondary purpose is to update these synaptic weights and to convert receptive synaptic weight matrixes into projective synaptic weight matrixes.

A single pair of synaptic weights is used between any two connected observers to filter the same feature at any position in the image. In other ways the synaptic weight values are the same for each neuron. During the integration phase of an observer, a pattern filter converts the presence of a specific localized feature into an active neuron in the next time slice in the same time cycle. Any time a feature is present in the input, image a single feature similarly located in the observer array is consequently activated.

Referring again to FIG. 8, the receptive synaptic weight matrix 81 is the exact same size as each small contiguous rectangular array 81 or 82 of neurons in observer A. A first small contiguous and rectangular array 82 of neurons in the observer A is observed by neuron X in observer B, where each neuron in the rectangle is observed through its corresponding synaptic weight in the receptive synaptic weight matrix 81. A second small contiguous and rectangular array 83 of neurons in the observer A is observed by neuron Y in observer B, where each neuron in the rectangle is observed through its corresponding synaptic weight in the receptive synaptic weight matrix 81.

FIG. 9 shows an example of the output pattern 91 that would be produced by an observer for a given pattern filter 90 and a given input pattern 92 from the immediately a upstream observer.

Synaptic weights can be positive (in which case integration will increase processing unit potential), zero (in which case integration has no effect on the potential), or negative (in which case integration decreases the potential). This three-logic-state approach allows the extraction of several features in a single pattern. For example, it is possible to extract both a vertical bar and a horizontal bar in the pattern of a cross.

Rank order coding: In at least one embodiment, all observers in the network use the rank order coding scheme. Rank order coding is a method used for making processed data invariant to contrast and luminosity by converting a list of numeric data into an ordered list which removes the exact value of elements and only keeps the corresponding spatial coordinates in a relative rank order. As an example of rank order coding, if the input list is {e1=3.2, e2=3.4, e3=2.7, e4=1.9, e5=4.1}, the corresponding output list would be {e5, e2, e1, e3, e4}, where each of e5, e2, e1, e3, e4 represents a different spatial (x,y) coordinate in the input.

The conversion process between images organized in pixels into the rank order coding is initiated at the output of the first layer of observers, i.e., the converters. The rank order coding process is based on the notion of dividing each time step of the algorithm into some number, n, of time slices (e.g., n=100), as illustrated in FIG. 5. In general, the number (n) of time slices per time step is predetermined and does not change.

Briefly, the rank order coding process is as follows: First, convert the (non-zero) convolved and thresholded potential values into ordered lists of coordinates, then assign the corresponding spatial coordinates of those values to the appropriate time slice according to their potential values, with higher values being placed in earlier time slices and lower values being placed in later time slices. Whatever the luminance or contrast is, the ranking of the convolved data remains constant.

Therefore, the ranked output list of an observer can be thought of as a histogram of spatial coordinates, where each time slice is a different bin of the histogram.

The integration process is done time slice by time slice. If the rank of data in an output list is different, then the integration process will give different results.

The following is a more detailed description of the rank order coding process done by an observer, for each neuron. First, the potential P of the neuron is linearly rescaled to be within the range from 0 to the number of time slices per time step. The potential P is then truncated to remove any fractional portion. The coordinate (i,j) of the neuron to which P relates is then added to the output list of the observer, indexed by P (which now reflects a time slice).

Initially there is one void bin in the output list for each time slice. The goal of the rank order coding is to fill the output list, indexed by time slice, with coordinates of neurons so that each time slice's bin will contain the coordinates corresponding to the linearly rescaled potential value. In other words, potential is converted to an integer index corresponding to the number of time slices.

Figure 10:
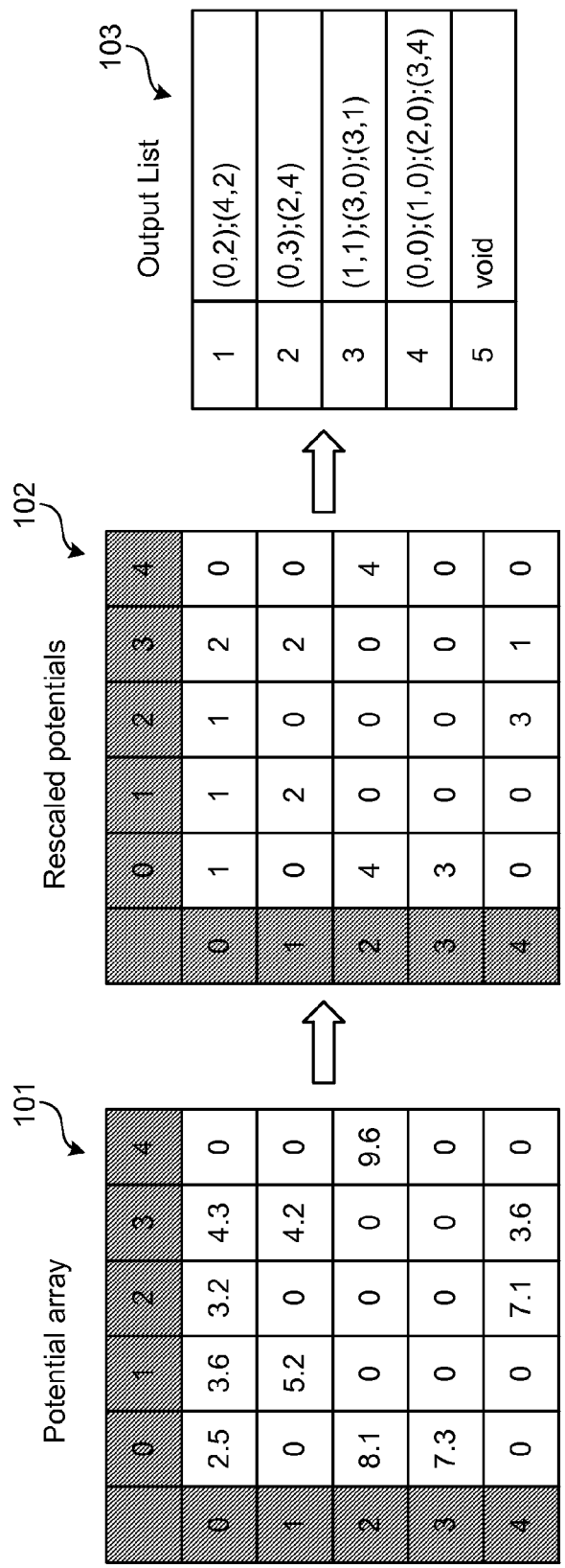
FIG. 10 shows an example of rank order coding of potentials.

Consider the simple example illustrated in FIG. 10. The far left matrix 101 shows the potentials for a set of neurons in a given observer. The x and y coordinates are shown with shading at the top and left of the matrix. The middle matrix 102 shows the rescaled potentials, and the array 103 at the right is the output list, indexed by time slice (i.e., by potential). This rank order coding allows the sorting of the potential array in 2n instead of n*log(n) if n is the number of elements of the array.

Runtime Process:

Operation of each observer is event driven, where the starting point of propagated information is the rank ordered list of data extracted from an input image and divided into sublists (output lists) of equivalent elements. For each time step (see FIG. 5), the input image is converted into an ordered (ranked) list (output list) of coordinates, where the placement of each coordinate in the list corresponds to the relative intensity (potential) inside the observed image.

Integration and fire: The integrate-and-fire model used by neurons adheres to the positional coding scheme and has no reference to meanings of objects or features except in the usage or relative position in patterns and observers. Classical neural network computation is based on the following algorithm: For each neuron, its potential is integrated by adding the product of each of its synaptic weights with the output state of the associated upstream neuron. In contrast, propagation in the neural network introduced here is event driven. It is more efficient, because most neurons remain inactive (generating no pulse) during each time slice. Using event driven propagation avoids adding zero to the sum the vast majority of the time during the integration process.

The basic integration operation in the technique introduced here is:

For each time slice and each neuron, the potential P of a unit increases as

P(t+1)=P(t)+Sum of all (synaptic weight (W) corresponding to an active input multiplied by a modulation factor (M))

At the beginning of each time cycle, the potential P of each neuron is reset to zero.

The modulation factor, M, is a mechanism used to decode the rank order coding. A consequence of using the modulation factor in the formula above is that the preferred order will always produce a higher potential, P. The modulation factor M is a real number between 0 and 1. At the beginning of each time cycle, it is reset to 1, then any time a synaptic weight is computed, the modulation factor M is multiplied by a shunting factor, beta, which is a positive real number close to but less than 1. That is, we have M(t+1)=M(t)*beta.

For each time slice and for each integrated processing unit, after the integration is computed, the firing phase begins. In the firing phase, for each time slice and for each integrated processing unit, if the potential P passes the neuron's threshold, T, then the neuron generates a new pulse in the output list of the observer for the next time slice. More precisely, the neuron includes the coordinate of that neuron (which is spatially mapped to a corresponding coordinate in the input image) in the output list of the observer.

Example of the integration process and rank order decoding: Suppose that we have four weights W1=4, W2=3, W3=2, W4=1. We can compute the final potential P of a processing unit receiving its inputs in the following order: I1, I2, I3, I4 and in the opposite order. Suppose that the shunting factor=0.75.

Let us start with the input temporal order I1, I2, I3, I4. THEREFORE, at the first time slice, P=W1*M=4*1=4 and M=M*beta; at the second time slice, P=4+W2*M=4+3*0.75 and M=M*beta; at the third time slice P=6.25+W3*M=6.25+2*0.5625 and M=M*beta; and during the last time slice, P=7.375+W4*M=7.796875.

By contrast, in the opposite temporal order I4, I3, I2, I1, we have P=1, P=2.5, P=4.1875 and P=5,875. In the preferred order (first case) the final potential is 7.796875, and in the worst order, the potential is only 5,875. A threshold can easily separate these two patterns, which are statically equivalent but dynamically different.

Projective pattern filters: The integration process uses the projective equivalent of pattern filters, as illustrated in FIGS. 8 and 11. The technique in essence reverses the synaptic weights matrix from a receptive point to a projective point. In certain embodiments, the pattern filters (synaptic weights matrices) are reversed from a receptive point to a projective point. More precisely, each pattern filter includes both a projective synaptic weight matrix and a receptive synaptic weight matrix, each being the transpose of the other, as shown in FIG. 11B. The result in the projective scheme is numerically exactly the same as in receptive scheme, but the performance is better because it requires fewer integration operations per time step than the receptive scheme.

If a neuron PU in the receptive scheme observes the inverted 'L' pattern in the input observer pattern at this exact position (marked as A,B,C D in pattern space FIG. 11A) and the only positive synaptic weights in the receptive synaptic weight matrix of the pattern filter are at positions {7,8,12,17,} it means that the input pattern is the best matching input for processing unit PU. Therefore, in the projective scheme, the output list will have four elements reflecting the activation of units A,B,C,D, and the integration of the projective synaptic weight matrix of the projective pattern filter will add the weights {8,7,12,17} as in the receptive scheme (the projective scheme of FIG. 11B illustrates the projective integration induced by coordinate B). However, in the projective scheme, there will be 25*4 basic integration operations (25 is the number of values in the matrix, 4 is the number of nonzero values), as opposed to 25*64 integration operations in the receptive scheme (64 is the size of the overall input image).

Practical Example of an Observer Network

Figure 12:
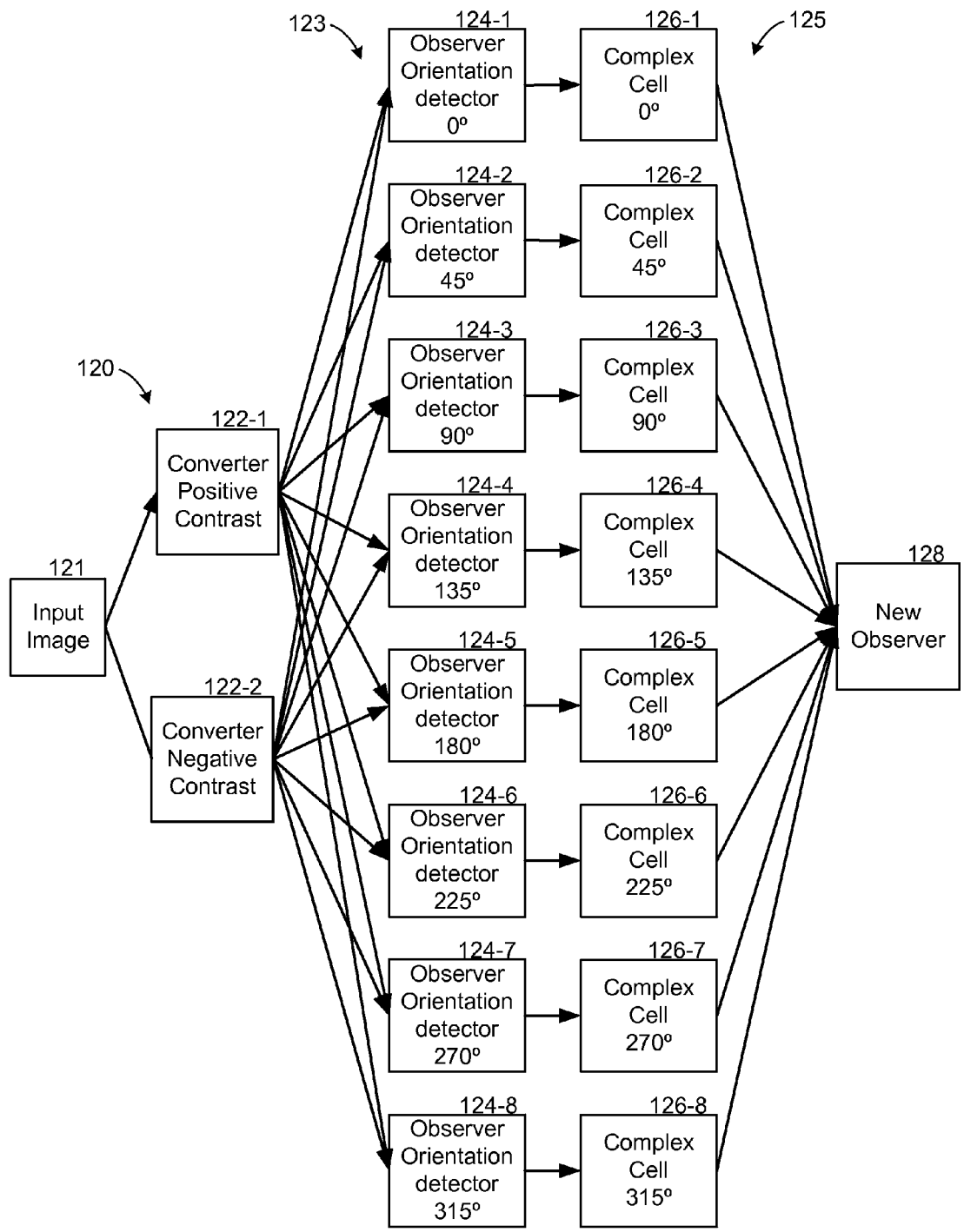
FIG. 12 illustrates a practical example of a pattern recognizer formed of a network of observers.

In a typical usage scenario, only an advanced developer will create new and more efficient pattern recognizers using the elements described above. Less advanced users can use a predefined network of observers. FIG. 12 shows an example of such a predefined network. It is general enough to be used in a lot of different domains of applications. Note that all of the observers in the network execute using the exact same algorithm (described in detail below); the difference between them is only in their positions in the network and the weights of the matrixes of the pattern filters which link them to their upstream observers in the network. Note that the pattern filters are not shown in FIG. 12, to avoid making the figure unnecessarily complex, although they are described below.

In the network of FIG. 12, the input image 121 is initially applied to the first layer (stage) 120 which includes two converters 122-1 and 122-2. The converters 122-1 and 122-2 determine a positive and negative contrast value (potential), respectively, for each pixel in the input image 121. Each converter 122 outputs a ranked output list of coordinates whose potentials exceed the specified threshold, as described above.

Each of the converters 122 provides its output to a second layer 123 of observers, which includes eight observers 124-1 through 124-8, which are referred to herein as "orientation detectors" to facilitate explanation. Each of the orientation detectors 124 receives its input from each of the converters 122, via a separate pattern filter. Each of the orientation detectors 124 is configured (by its immediately upstream pattern filter) to detect features at a different angular orientation in the input. The reason for detecting local orientations is to determine the nature of the variation previously detected by the contrast converters.

The settings of the weights in the synaptic weight matrices in each pattern filter of an orientation detector 124 determine the orientation of features that will be detected by the orientation detector. For example, the first orientation detector 124-1 is configured to detect features oriented at 0 degrees, the second orientation detector 124-2 is configured to detect features oriented at 45 degrees, the third orientation detector 124-3 is configured to detect features oriented at 90 degrees, and so on in 45 degree increments up to 315 degrees. Thus, the output list of each orientation detector is a ranked list of coordinates at which a feature having the specified orientation was detected in the input image.

In one embodiment, the synaptic weight matrices of the pattern filters associated with the orientation detectors are Sobel matrices, in which the weight values are from the well-known Gabor filter function:

$$g(x, y; \lambda, \theta, \psi, \sigma, \gamma) = \exp\left(-\frac{x'^2 + \gamma^2 y'^2}{2\sigma^2}\right)\cos\left(2\pi\frac{x'}{\lambda} | \psi\right)$$

where $x' = x \cos\theta | y \sin\theta$ and $y' = -x \sin\theta | y \cos\theta$ The parameter $\lambda$ represents the wavelength of the cosine factor, $\theta$ represents the orientation of the normal to the parallel stripes of a Gabor function, $\psi$ is the phase offset, $\sigma$ is the sigma of the gaussian envelope and $\gamma$ is the spatial aspect ratio, and specifies the ellipticity of the support of the Gabor function.

Each orientation detector 124 has two pattern filters, one to process the output of the positive contrast converter 122-1 and one to process the output of the negative contrast converter 122-2.

As an example, for the orientation detector for 0 degrees, a 3×3 receptive synaptic weight matrix of the pattern filter connected to the output of the positive contrast converter 122-1 can be defined as shown in Table 1A, while a corresponding receptive synaptic weight matrix of the pattern filter connected to the output of the negative contrast converter 122-2 can be defined as shown in Table 1B.

TABLE 1A

| 1  | 2  | 1  |
|----|----|----|
| 0  | 0  | 0  |
| -1 | -2 | -1 |

TABLE 1B

| -1 | -2 | -1 |
|----|----|----|
| 0  | 0  | 0  |
| 1  | 2  | 1  |

For the orientation detector for 45 degrees (124-2), examples of the 3×3 receptive synaptic weight matrices connected to the outputs of the positive and negative contrast converters and negative contrast converters are shown in Tables 2A and 2B, respectively:

TABLE 2A

| 0 | 2  | 0  |
|---|----|----|
| 2 | 0  | -2 |
| 0 | -2 | 0  |

TABLE 2B

| 0  | -2 | 0 |
|----|----|---|
| -2 | 0  | 2 |
| 0  | 2  | 0 |

For the orientation detector for 90 degrees (124-3), examples of the 3×3 receptive synaptic weight matrices connected to the outputs of the positive and negative contrast converters and negative contrast converters are shown in Tables 3A and 3B, respectively:

TABLE 3A

| 1 | 0 | -1 |
|---|---|----|
| 2 | 0 | -2 |
| 1 | 0 | -1 |

TABLE 3B

| -1 | 0 | 1 |
|----|---|---|
| -2 | 0 | 2 |
| -1 | 0 | 1 |

And so on for other orientations.

Referring back to FIG. 12, each of the orientation detectors 124 provides its output to a third layer 125 of observers, which includes eight observers 126-1 through 126-8, which are referred to herein as "complex cells" to facilitate explanation. Each of the complex cells 126 receives its input from only one of the orientation detectors 124, via a separate pattern filter.

Complex cells 126 have two main properties, by virtue of the weights in their pattern filters. The first property is to relax the geometric constraint of localization (in the image geometry space, not in the positional coding). This relaxation is given by the width of the positive weights in the matrix. The reason to relax this geometric constraint is to increase the level of matching based on local orientation features.

The second property is to give temporal priority (in a time slice sense) to neurons which observe the end of a local feature relative to those which observe the center of a local feature.

Figure 13:
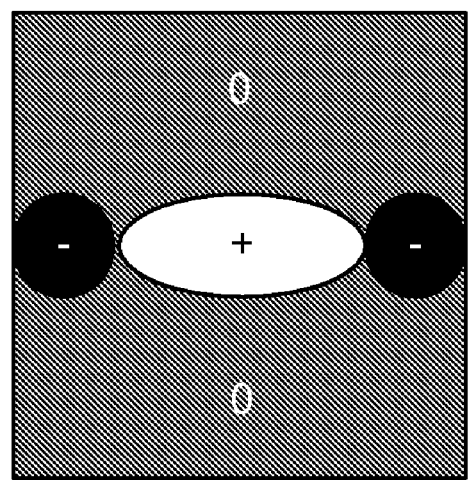
FIG. 13 illustrates the characteristics of a synaptic weight matrix for the complex cells observers shown in FIG. 12.

The nature of the synaptic weight matrices for any of the complex cells is illustrated in FIG. 13. It can be seen that values in the matrix which are close to the horizontal center axis of the matrix are positive, except near the outermost points, where they are negative. All other values in the matrix are zero. Essentially any matrix which roughly has the illustrated shape and properties will produce these two properties.

Any new observer(s) 128 would be created in the next layer (i.e., a fourth layer in the network of FIG. 12), and each new observer would have the same upstream observers, i.e., the eight oriented complex cells. The size of the pattern filter is defined by the size of the user selection. When the user adds a new observer, it creates a new recognition ability for the system.

Creating an observer network (a pattern recognizer) can be compared to creating a structure with the LEGO game. In the LEGO game, not all the created structures look like a real world object (car, house, plane, etc.), but the nature of the LEGO brick allows one to build essentially whatever structure you want; it is just a question of imagination, observation, ability to reproduce, etc. In the techniques introduced here, we allow the user to build recognition functions instead of physical structures. Not all conceivable networks will provide interesting recognition properties, but some of them will.

Detailed Description of Algorithms

Observer Engine

Figure 14:
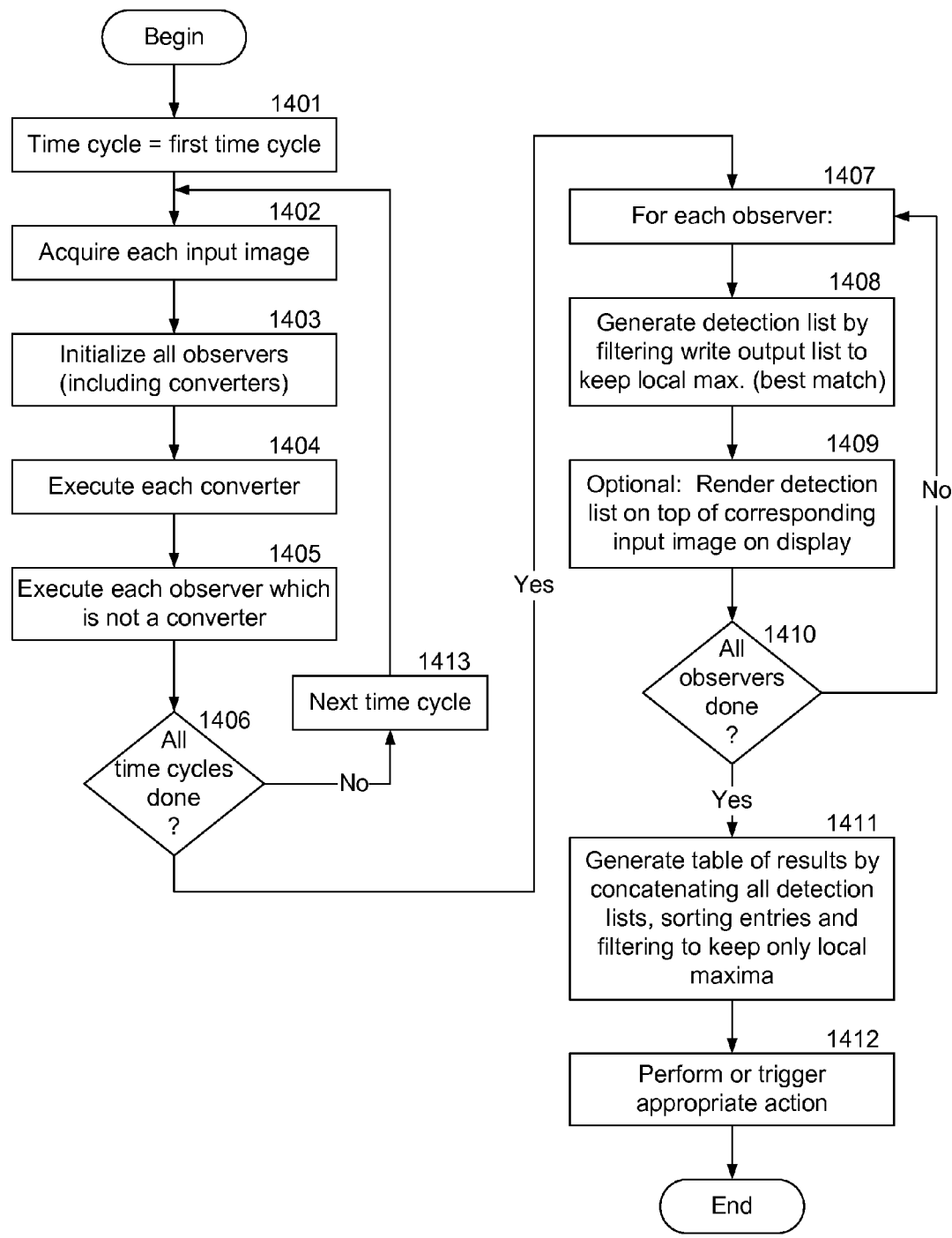
FIG. 14 shows an example of an algorithm executed by the observer engine, for streamed input.

FIG. 14 shows an example of the algorithm executed by the observer engine, for streamed input (e.g., video or audio). The difference between how streamed input is handled versus single-image input is discussed below.

The algorithm is described now for a single time step (which includes multiple time slices). Initially, at 1401 the current time cycle is initialized to the first time cycle. Next, at 1402 the observer engine acquires a set of input images from a user-selected input source (e.g., a web camera or audio subsystem microphone). All observers in the selected network, including converters, are then initialized by the observer engine at 1403, according to a process described below.

After all observers have been initialized, each converter in the network is executed by the observer engine at 1404. The process of executing a converter is described further below. Next, each observer which is not a converter is executed by the observer engine at 1405, also as described further below.

At 1406, if all time cycles in the current time step have been completed, the engine proceeds to 1407; otherwise, the engine increments the time cycle at 1413 and then loops back to 1402.

Beginning at 1407, the engine performs operations 1408 and 1409 for each observer (1410) other than converters in the network. Each observer (other than converters) receives one output list as input, which is designated its "read output list", and produces another output list as output, which is designated its "write output list". At 1408 the observer engine generates a detection list for a particular observer by filtering its write output list to keep only local maxima of any clustered elements in the list ("clustered" refers to physical proximity in the input image). At 1409, optionally, the observer engine renders the detection list on top of the corresponding input image on a display device.

After all observers have been processed per 1408 and 1409, the observer engine generates a table of results at 1411 by concatenating all of the detection lists for all of the observers, sorting the entries and filtering them to keep only local maxima of any clustered elements. The observer engine then performs or triggers a desired action at 1412, based on the table of results. For example, the engine might cause the table to be displayed to a user. As other examples, the engine might trigger an operation such as indexing, sorting, comparing, initiating a visual effect or sound effect, or essentially any other desired action.

For single image input, the algorithm is similar but not identical. The basic difference is that for single-image input, operation 1404, the execution of each observer, is iterated for each of the layers of the observer network. Two observers are considered to be in the same layer (stage) if their depth, e.g. their distance from the input, is the same. The entire network of observers can be thought of as a pipelined processor. If an input image is presented at the input of the network, several time cycles (time steps) will be necessary for an input to reach the output of the network. Information crosses one stage of the network per time cycle. The number of necessary time cycles is equal to the depth of the network according to classic graph theory.

In the algorithm for streamed input, the pipeline is fed at each time step, so the engine's algorithm does not need to incorporate the notion of layers. Regardless of the network structure, each observer needs to execute an integrate-and-fire process at each time cycle. However, in the single input image algorithm, it is desired only to compute each observer once. To accomplish that, the observer network is ordered in layers reflecting their depth from the input layer. Consequently, the information propagation is computed from the input image to the deepest observer in the network efficiently.

Initializing an Observer

Figure 15:
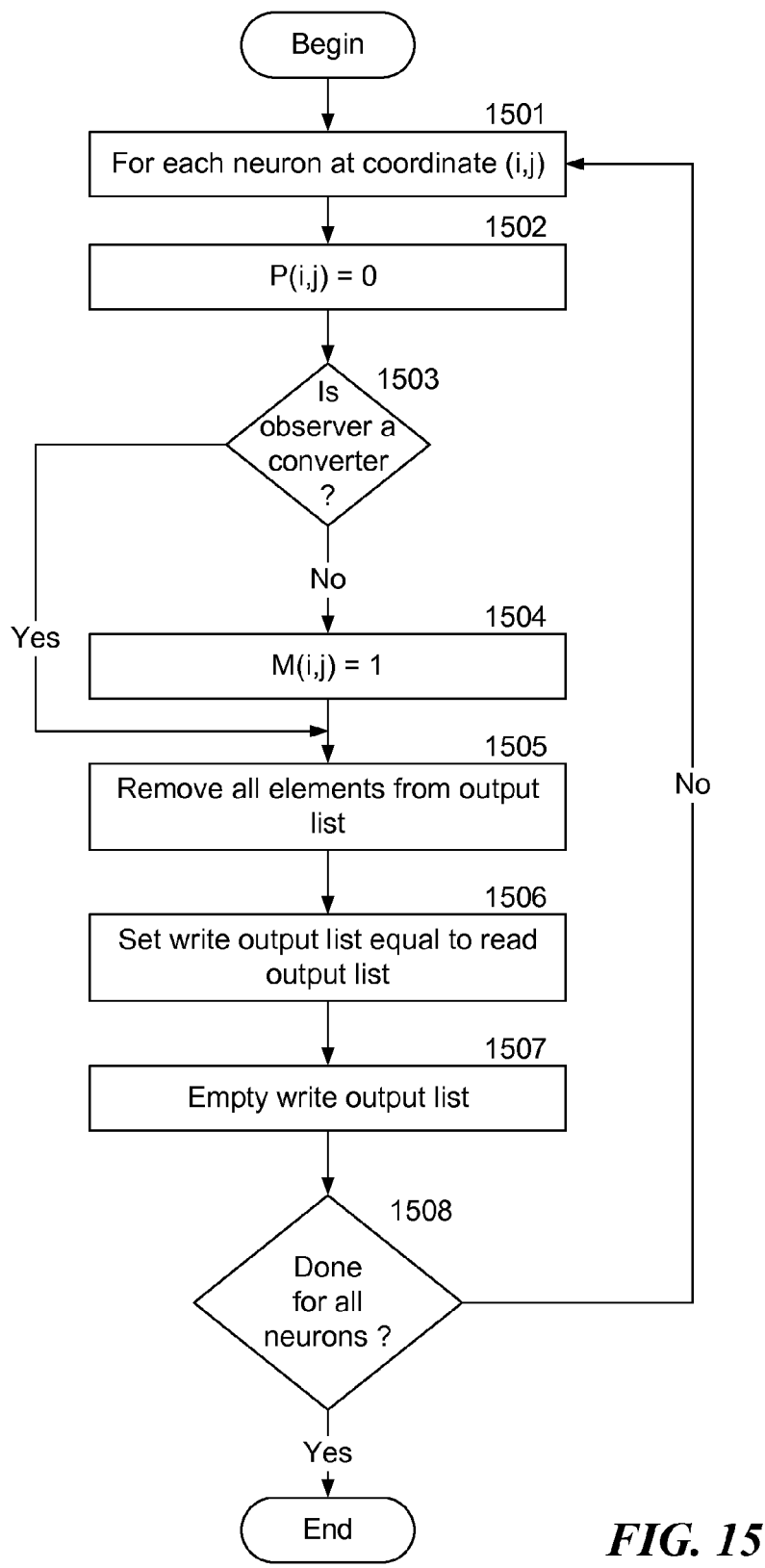
FIG. 15 shows an example of a process for initializing an observer.

FIG. 15 shows an example of the process for initializing an observer, as done in operation 1403 described above. Operations 1501 and 1508 cause the following set of operations to be executed for each neuron (having coordinate (i,j)) in the observer. First, the potential P(i,j) of the neuron is initialized to zero. If then observer is a converter (1503), the process proceeds to 1505; otherwise, the modulation factor M(i,j) is initialized to 1, and the process then proceeds to 1505.

At 1505 all elements are removed from the write output list of the observer. The write output list is then set equal to its read output list (i.e., to the write output list of the next upstream observer) at 1506. At 1507 the process empties the write output list.

Executing a Converter

Figure 16:
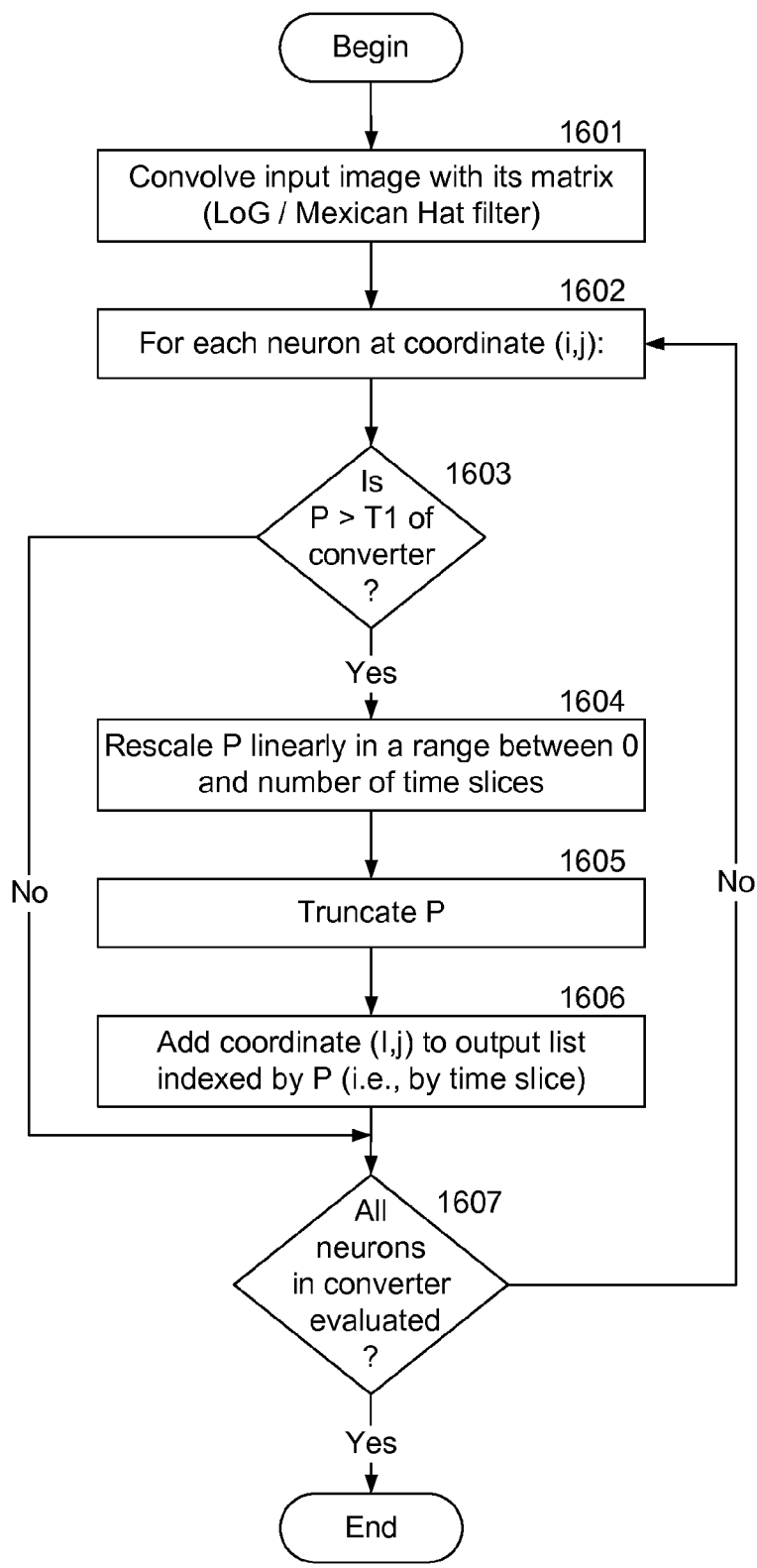
FIG. 16 shows an example of an algorithm for executing a converter.

FIG. 16 shows an example of the algorithm for executing a converter. Initially at 1601 the converter convolves the input image with its convolution kernel (matrix). As noted above, this kernel can be any Mexican hat shaped function, such as LoG. Next, 1602 and 1607 cause the following set of operations to be executed for each neuron (having coordinate (i,j)) in the converter.

First, the converter determines at 1603 whether the potential P of the neuron exceeds a predetermined threshold, T1. The threshold T1 may be user-specified or a default parameter. If P does not exceed T1, the process proceeds to evaluate the next neuron. If P exceeds T1, then at 1604 the converter rescales P linearly in a range between 0 and the number of time slices in each time step. The converter then truncates P at 1605 to remove any fractional portion, and adds the coordinate (i,j) of the neuron to its write output list indexed by P (i.e., by time slice).

Executing Observers Other than Converters

Figure 17:
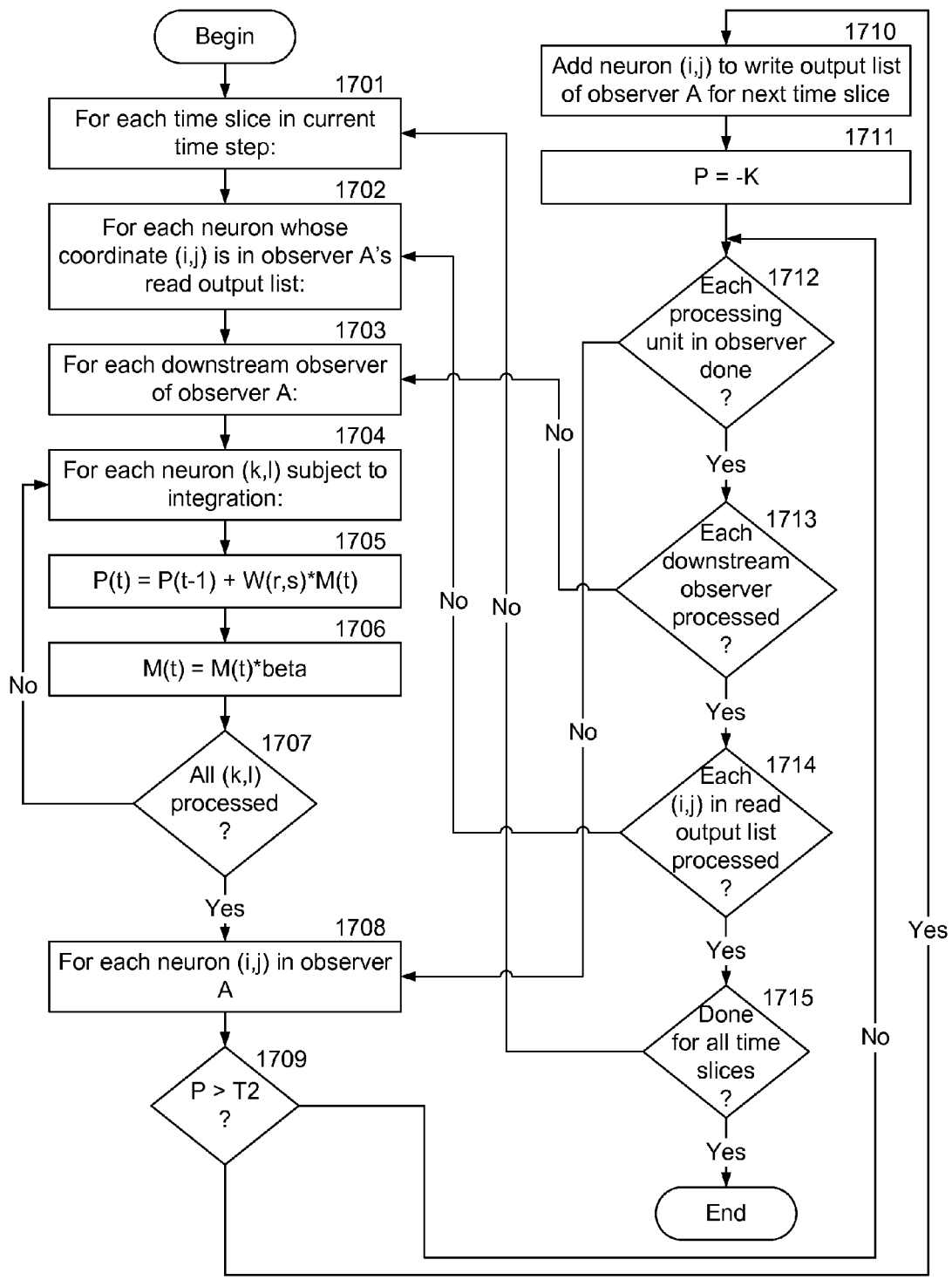
FIG. 17 shows an example of an algorithm for executing an observer which is not a converter.

FIG. 17 shows an example of the algorithm for executing an observer which is not a converter. The process is also illustrated conceptually in FIG. 18. The observer is designated "observer A" in FIG. 17 to facilitate explanation. Operations 1701 and 1715 cause the following set of nested loops to be executed for each time slice in the current time step.

Figure 18:
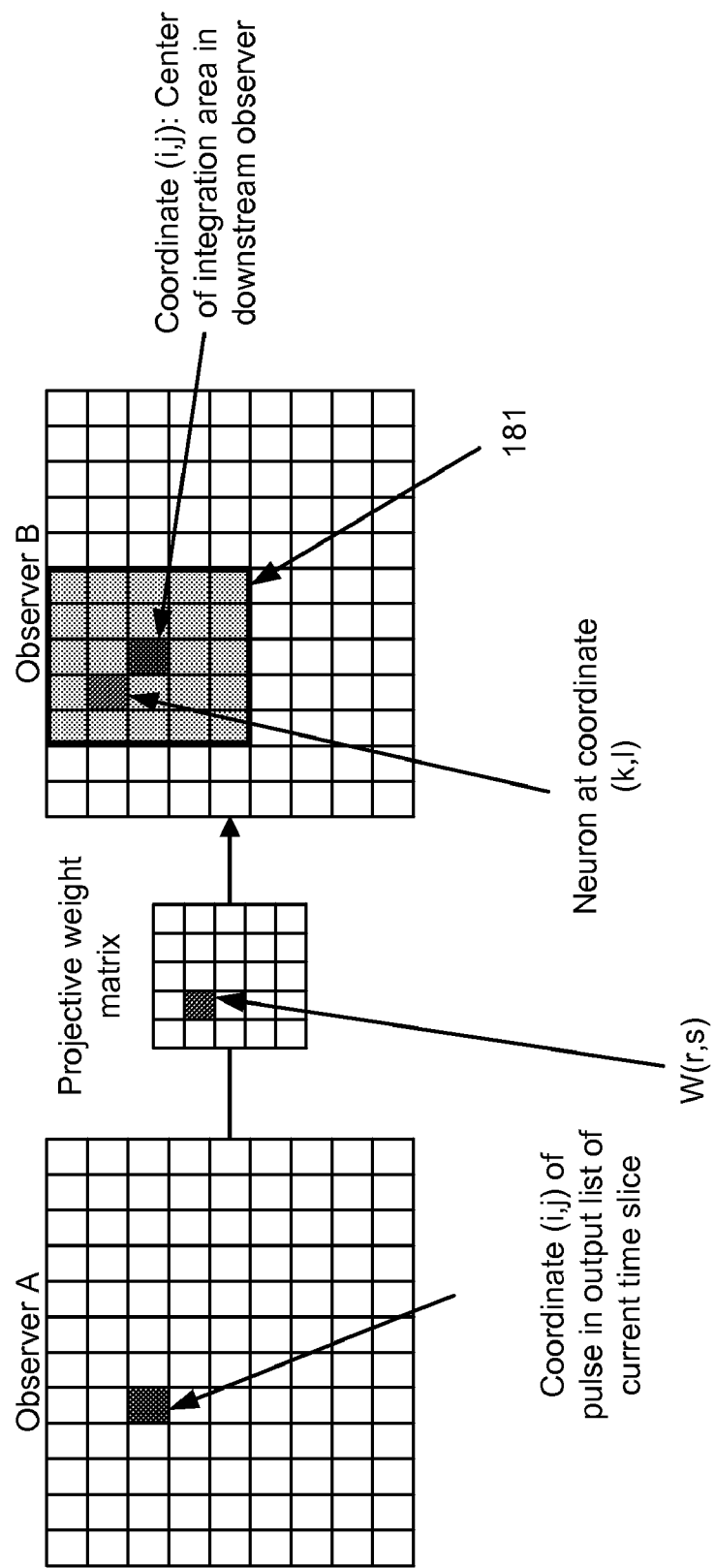
FIG. 18 conceptually illustrates execution of an observer which is not a converter.

For each neuron whose coordinate (i,j) is listed in observer A's read output list (1702), and for each immediately downstream observer ("observer B") that is connected (via a pattern filter) to observer A (1703), and for each neuron (having coordinate (k,l)) subject to integration (1704) in observer B, observer A computes the potential P(t) for the current time slice as $$P(t)=P(t-1)+W(r,s)*M(t)$$

as illustrated in FIG. 18,
where:
W(r,s) is the weight value at coordinate (r,s) of the projective synaptic weight matrix in the pattern filter of observer B, used for integration of the neuron at coordinate (k,l) in observer B while neuron (i,j) in observer A is integrating;

$$M(t)=M(t)*\text{beta};$$

beta is the shunting factor discussed above;
r=k−I+N/2 belongs to interval [0,N], where N is the width of the projective synaptic weight matrix; and
s=l−j+P/2 and belongs to interval [0,P], where P is the height of the projective synaptic weight matrix.

Reference numeral 181 indicates the area covering all neurons subject to the integration process induced by the neuron of observer A at coordinate (i,j). Coordinate (i,j) in Observer B is the center of the integration area in Observer B.

Next, if all neurons (k,l) subject to integration have been processed (1707), then the process proceeds to 1708. Beginning in 1708, for each neuron (having coordinate (i,j)) in observer A, if that neuron's potential P exceeds a predetermined threshold T2 at 1709, then at 1710 observer adds the coordinate (i,j) of the neuron to observer A's write output list of observer A for next time slice. The threshold T2 may be user-specified or a default parameter. The observer then sets the potential P equal to a negative value, −K, to prevent the neuron from being reactivated in the current time step. If that neuron's potential P does not exceed threshold T2 at 1709, then the process proceeds from 1709 to 1712.

Per 1712, operations 1709-1711 are carried out as described above for each neuron in observer A. Per 1713, operations 1704-1712 are carried out as described above for each downstream observer of observer A. Per 1714, operations 1703-1713 are carried out as described above for each neuron whose coordinate is listed in the read output list of observer A. Per 1715, operations 1702-1714 are carried out as described above for each time slice of the current time step.

Creating a New Observer

The user can create a new observer in the network to recognize a new pattern. Creation of a new observer can be done between two time steps of runtime. In the case of streaming input, creation of a new observer does not stop the runtime. Creation of a new observer involves the creation of a new array of neurons and a set of pattern filters connected to upstream observers previously created. Each new pattern filter is stored in both the receptive scheme for the learning process and in the projective scheme for the integration process.

Now consider a practical example of creating a new observer. Assume a user wants to create a mouth-with-smile recognizer and a mouth-with-no-smile recognizer. The user can create a new observer for a mouth-with-smile and a new observer for a mouth-with-no-smile. The reason he will create two new observers in this example is that he clearly wants to recognize two different shapes of the same object.

Note, however, and for mouth-with-smile in particular, that a single example, e.g., the example used for the creation of the new observer, may not be enough to create a sufficiently robust mouth-with-smile recognizer. Sometimes the observer may consider something in the background as a mouth-with-smile, and sometimes it may fail to recognize a mouth-with-smile. Therefore, the capabilities of an observer to learn by example or by counter-example, as described below, allow the user to teach the observer to remove false detections in the background and to make the mouth-with-smile detection more reliable. The user will have the same problem with the mouth-with-no-smile, and may have to teach this observer for the same reasons.

When creating a new observer, the size of the new pattern filters (i.e., the size of both the receptive and projective synaptic weight matrices) is based on the size of a user-selected region in the image and also takes into account any scale reduction of the upstream observers. The initial synaptic weight matrices of a pattern filter are created by using the output ordered list of the new observer upstream in the position defined by the user's selection.

Elements of the output list of an observer are, in essence, spikes ordered in time. Values are given to elements of the list depending on their relative order, the first elements being given the highest value, the last being the lowest value. Therefore, the initial synaptic weights for an observer's pattern filter are all positive values.

Figure 20:
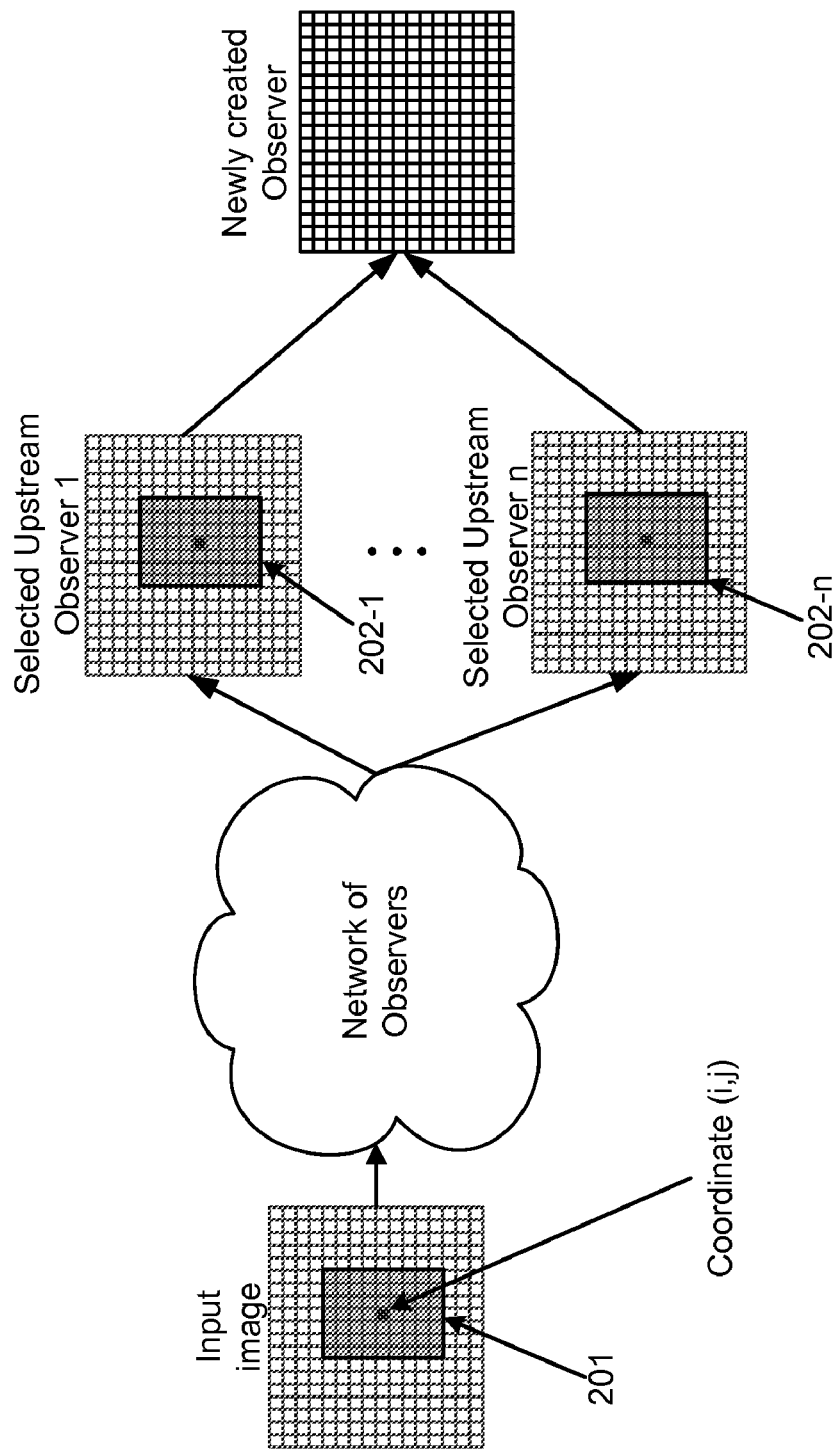
FIG. 20 conceptually illustrates the process of creating a new observer.

At this point, the preferred pattern for the new observer will be the pattern used to create the synaptic weights. Therefore, the content of the user's selection in the input image will produce a maximum potential P for the neuron which is located at the center of the user's selection in the new observer, as shown in FIG. 20.

Figure 19:
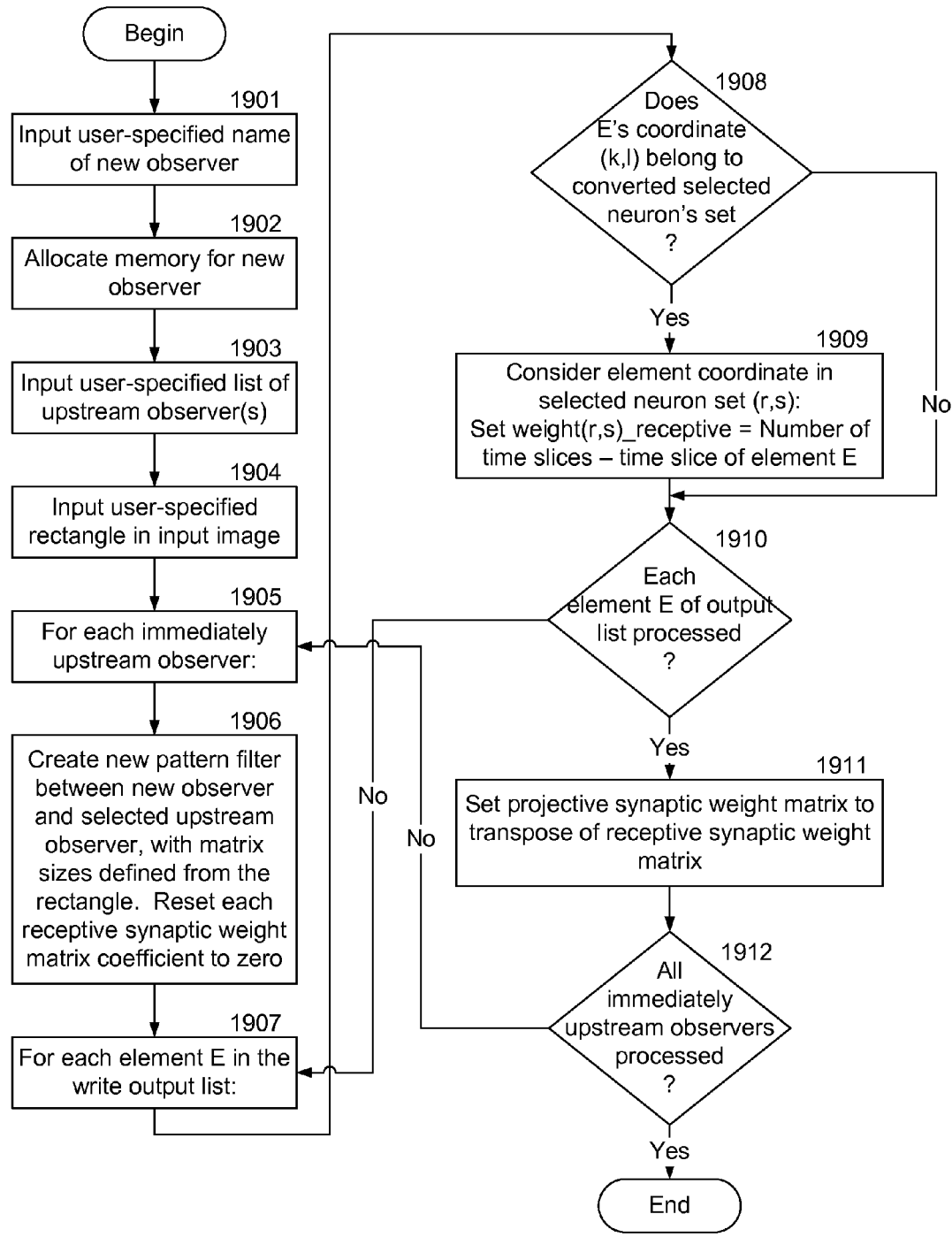
FIG. 19 illustrates an example of a process of creating a new observer.

An example of the process of creating a new observer is illustrated in FIG. 19. The process can be performed by the tools module and the GUI shown in FIG. 4. Refer also to FIG. 20, which illustrates the process conceptually.

Initially, at 1901 a user input specifying the name for the new observer is received via the GUI. Next the process allocates memory for the new observer at 1902. At 1903 the process inputs a user-specified list of the observers that are immediately upstream from the new observer. These are the observers whose output lists the new observer will process, via its pattern filters. At 1904 the process inputs a user-specified rectangle 201 as a selection in the input image, where the rectangle 201 has dimensions N×P pixels. The pixel closest to the center of the selected rectangle 201 has coordinate (i,j). The rectangle 201 may be defined by the user using any conventional image selection tool, such as a mouse pointer or the like. The size of the rectangle 201 defines the size of the synaptic weight matrices in the pattern filters of the new observer.

Next, per 1905 and 1912 the following set of operations is performed for each immediately upstream observer of the new observer. First, at 1905 the process creates a new pattern filter between the new observer and the currently selected upstream observer, with matrix sizes defined from the user-specified rectangle. Next, at 1906 the process resets each receptive synaptic weight matrix coefficient to zero. Then, for each element E in the write output list (1907), the process determines at 1908 whether the element's coordinate (k,l) belongs to the converted selected neuron's set, which is the region of interest (ROI) defined by: 1) a center which is the transformed coordinate (i,j) in the upstream observer coordinate system after applying the chain of coordinate transform (scale and translation) imposed by the network of observers, and 2) a size which is the size of the pattern filter linking the newly created observer and the upstream observer, Observer I. If the element's coordinate does belong to that ROI, then at 1909 the process sets the weight value at coordinate (x,y) in the receptive synaptic weight matrix (weight(x,y)_receptive) equal to the number of time slices minus the time slice of element E in the output list By design, the receptive synaptic weight matrix has the same dimension as the ROI mentioned above. In that case coordinates (x,y) are the coordinate of the weights inside the receptive synaptic weight matrix (starting (0,0) upper left which is the classical convention for matrixes). The conversion of a coordinate (k,l) into the ROI, i.e. the receptive synaptic weight matrix's coordinate system, is defined by $x=k-i+N/2$ and $y=l-j+P/2$, where N and P are respectively the width and heights of the receptive synaptic weight matrix and (i,j) is the center of the ROI.

After each element E of the write output list has been processed (1910), the process sets the projective synaptic weight matrix equal to the transpose of the receptive synaptic weight matrix at 1911. Per 1912, the process then loops back to 1905, unless all immediately upstream observers have been processed.

In FIG. 20, rectangles 202-1 and 202-n indicate the converted selected neurons based on the user's selection in input image. If the observers have the same size as the input image and are not translated, the selection is centered around the neuron (i,j) and has the same size, N by P. Translation changes the center position (i,j) but not the size. Rescaling an observer changes both the center coordinate and the selection size. Classic geometry can be applied.

Observer Learning (Teaching an Observer)

As noted above, the user can teach an existing observer in the network to improve the accuracy of its recognition. Observers use a supervised method for learning new categories of features. This method is based on a selection in the input image itself (e.g., by a user), and propagation of the image in the network of observers. This approach allows the creation of a specific pattern recognizer without the user having to write code to create the pattern recognizer.

The result of observer learning is to update the weights in the synaptic weight matrices of the observer. The technique introduced here allows for refinement of the weights by giving (positive) examples or counter- (negative) examples. In one embodiment, the user clicks roughly on the center of the example (or counter-example) in the input image, as displayed on a display device. The pattern recognizer then searches for the coordinates in the image that have a maximum of potential in the targeted observer (corresponding to the best matches) and corrects the user's click coordinate. When the best matching coordinates are found, the pattern recognizer reconstructs the equivalent selections in the upstream observers as in the creation of a new observer process (as described above). This selection is created by using the best matching coordinates and pattern filter size (i.e., the size of the synaptic weight matrices). The contents of this selection in each upstream observer are used to update the synaptic weights.

In the case of learning by example, for each synaptic weight and its associated input value, an average is computed to make the new synaptic weight better adapted to the new example, while keeping an adaptation to all the previous examples at the same time.

In the case of learning by counter-example, for each element of the input value, if the input element is not zero and the associated synaptic weight is not zero, the input value remains unchanged. If the input element is not zero and the associated synaptic weight is zero, the input value remains sign changed (i.e., becomes negative). The same average method is used in the negative example case as in the positive example case, with the modified input values.

Figure 21A:
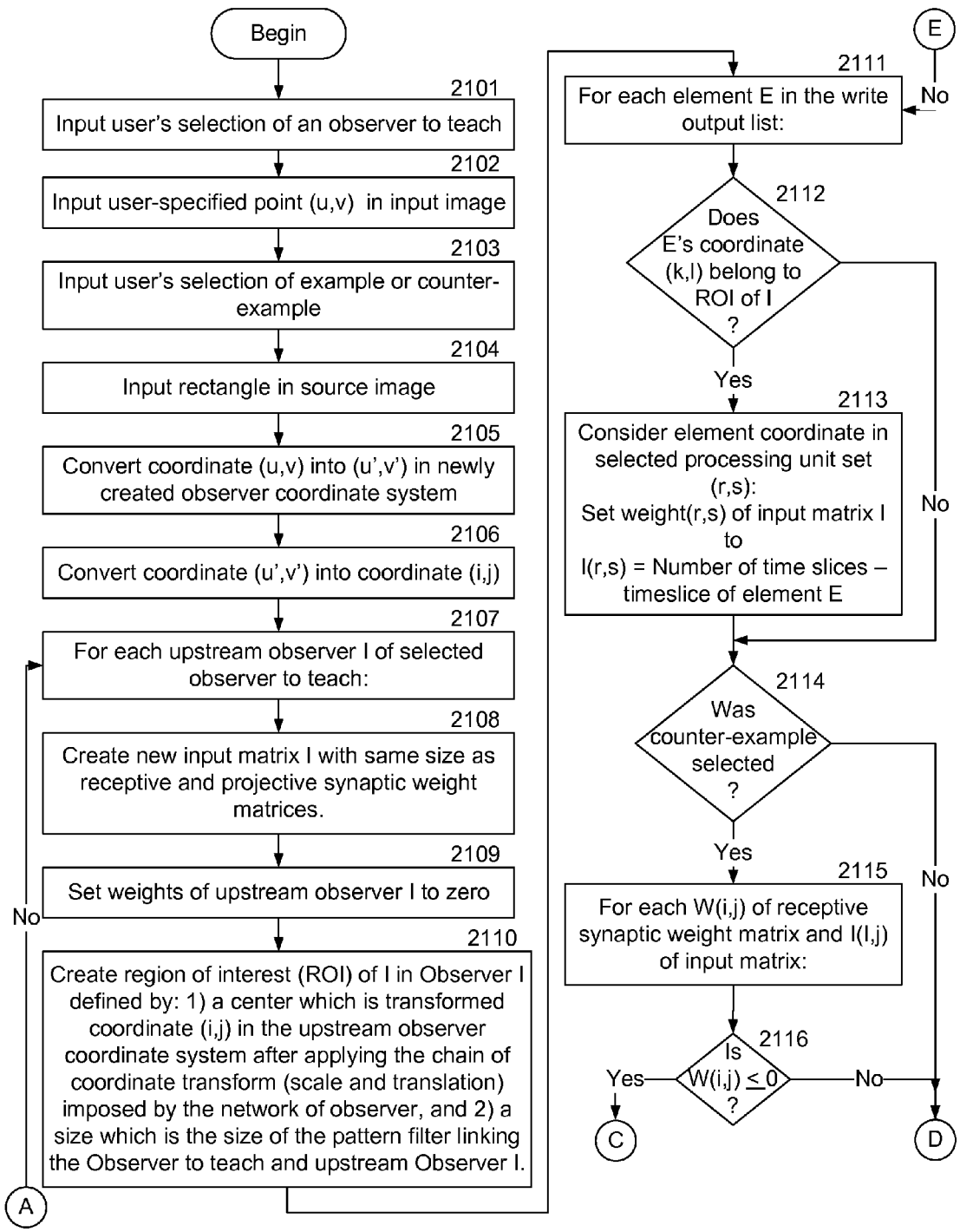
FIGS. 21A and 21B together show an example of a process for observer learning (also called teaching an observer)
Figure 21B:
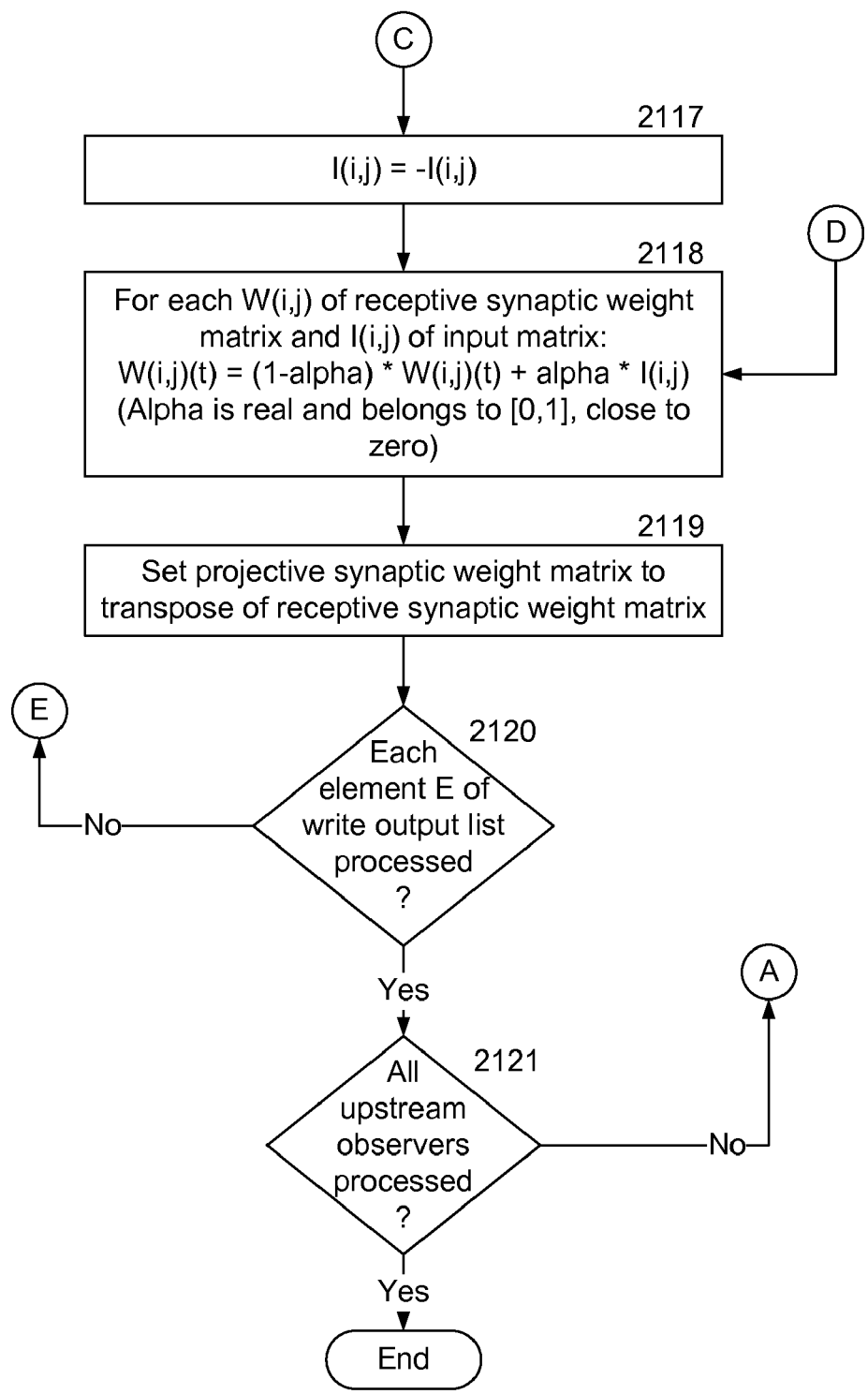
Figure 22:
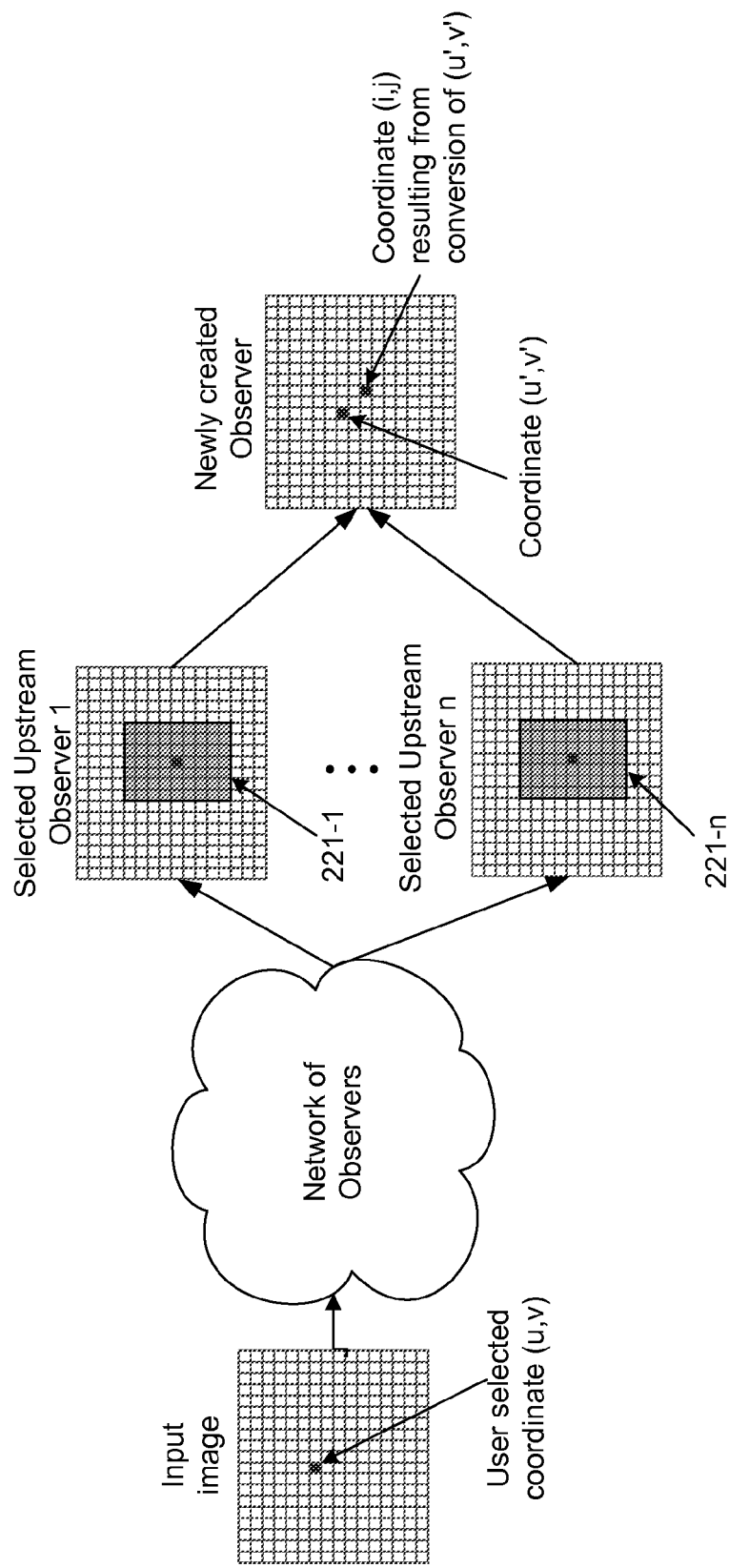
FIG. 22 conceptually shows An example of a process for observer learning.

FIGS. 21A and 21B together show an example of a process for observer learning (also called teaching an observer). Reference is also made to FIG. 22, which illustrates the process conceptually. Initially, at 2101 the process inputs a user's selection of an observer to teach. The selection may be made via the GUI. At 2102 the process inputs a user-specified point (u, v) in the input image. Next, a process inputs a user's selection of whether the process will teach by example or counter-example at 2103, and then inputs a user selected rectangle in the source image at 2104 as the example or counter-example.

At 2105 the process converts the coordinate (u,v) into another coordinate (u',v') in the newly created observer coordinate system. Coordinate (u',v') is the transformed coordinate of the user selected coordinate (u,v) in the upstream observer coordinate system after applying the chain of coordinate transform (scale and translation) imposed by the network of observers. Coordinate (u',v') is then converted at 2106 into a new coordinate (i,j).

Regarding operation 2106, the user selected transformed coordinate (u',v') is not the most optimal coordinate as an input for the learning process. Therefore, operation 2106 determines the most optimal coordinate around (u',v'), to which to apply the learning process. More specifically, if the detection list of the observer to teach is not void and contains a coordinate (x,y) close to (u',v'), i.e. where u'-x<N/2 and v'-y<P/2, where N and P are respectively the common width and heights of the receptive synaptic weights matrices (by design, all the receptive synaptic weights matrices of a newly created observer have the same dimensions), then coordinate (i,j) is considered to be coordinate (x,y). Otherwise (i.e., if no detection has been found around u',v' according to the constraint above), coordinate (i,j) is considered to be the coordinate of the local maximum of potential around (u',v'), where "around" in this context is defined by the ROI centered at (u',v') and the size of which is N by P, where N and P are respectively the width and heights of the receptive synaptic weights matrix.

After 2106, per 2107 and 2121 the process performs the following set of operations for each upstream observer I of the selected observer. First, at 2108 the process creates a new input matrix having the same size as the receptive and projective synaptic weight matrices of the selected observer. At 2109 the process sets all of the weights of the upstream observers (i.e., the matrix coefficients) to zero. The process then creates a region of interest (ROI) 221 (see FIG. 22) of I in the upstream observer I, where the ROI 221 is defined by: 1) a center which is transformed coordinate (i,j) in the upstream observer coordinate system after applying the chain of coordinate transform (scale and translation) imposed by the network of observers, and 2) a size which is the size of the pattern filter linking the Observer to be taught and the upstream Observer I.

Then, for each element E in the write output list (2111, 2120), the process reforms a sequence to noted by operations 2112-2119. At 2112, but process determines whether element E's coordinate (k,l) belongs to the ROI of observer I. If it does, the process proceeds to 2113; otherwise, the process jumps to 2114. At 2113, the process considers the element coordinate in selected neuron set (r,s), and sets the weight(r,s) of input matrix I equal to the number of time slices per time step minus the time slice of element E. In that case coordinate (r,s) is the coordinate of the weights inside the input matrix (starting with (0,0) at the upper left, which is the classical convention for matrices). The conversion of a coordinate (k,l) into the ROI, i.e. the receptive synaptic weight matrix's coordinate system, is defined by $r=k-i+N/2$ and $s=l-j+P/2$, where N and P are respectively the width and heights of the input matrix (which is the same as the size of the ROI and the receptive synaptic weight matrix) and (i,j) is the center of the ROI.

At 2114, if the user had chosen to teach by counter-example, then the process jumps to 2118, described below. Otherwise, the process continues with 2115. At 2115, the process initiates a set of operations for each weight value W(i,j) of the receptive synaptic weight matrix and I(i,j) of the input matrix of the observer to be taught. Specifically, at 2116 the process determines whether the weight W(i,j) is less than or equal to zero. If it is, the process then sets I(i,j) equal to −I(i,j) at 2117 and then proceeds to 2118. If it is not less than or equal to zero, the process jumps directly to 2118.

At 2118, for each weight W(i,j) of the receptive synaptic weight matrix and I(i,j) of the input matrix, the process sets weight W(i,j)(t) equal to the quantity $((1-\alpha)*W(i,j)(t)+\alpha*I(i,j))$, where alpha is a real number close to zero in the interval [0,1]. The process then sets the projective synaptic weight matrix equal to the transpose of the receptive synaptic weight matrix at 2119.

Operation 2120 then checks whether each element E of the output list has been processed, and if not, the process loops back to 2112. After all elements in the output list have been processed, operation 2121 checks whether all upstream observers of the selected observer have been processed, and if not, the process loops back to 2107. After all upstream observers have been processed, the process ends.

An observer can be "recycled", i.e. have its synaptic weight matrices reset, by using the above described process for creating a new observer, but without changing the size of the synaptic weight matrices. An example of when recycling an observer may be desirable is, if the source is a video stream and the user has selected a moving object in the video is not satisfied by its selected pattern, yet the user is satisfied with the size of the selection. By recycling the observer, the synaptic weights can be reset easily by the user simply clicking at the center of the region of interest.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a conventional computer, game console, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
adding a new observer to a network of observers in a machine-implemented processing system, the network including a plurality of observers operatively coupled to each other in successive stages, each stage including at least two observers, each of the plurality of observers configured to produce an output in response to recognizing a different type of pattern in an input image; and
configuring the new observer to recognize a pattern in the input image in the machine-implemented processing system, based on output of at least one observer of the plurality of observers, wherein said configuring includes
responsive to input from a user, specifying a set of upstream observers from which the new observer is to receive input;
responsive to input from the user, specifying a location in the input image to which to initialize each of the pattern filters;
responsive to input from the user, specifying a set of pattern filters using which the new observer is to process input from upstream observers;
responsive to input from the user, specifying a location in the input image to which to initialize each of the pattern filters.

2. A method as recited in claim 1, further comprising configuring the new observer to recognize the pattern based on output of at least two observers of the plurality of observers.

3. A method as recited in claim 1, wherein said configuring further comprises:
selecting the size of a pattern filter based on a user selection of a subset of the image.

4. A method as recited in claim 1, further comprising:
teaching the new observer in response to a user input, by adjusting a set of weights used by the new observer in recognizing the new pattern in response to the user input.

5. A processing system comprising:
a processor; and
a memory coupled to the processor and storing code which, when executed by the processor, causes the processing system to perform a set of operations including
using a first plurality of observers in a network of observers, to identify a plurality of units, of an input image, that represent a feature;
using a second plurality of observers in the network of observers, to attempt to recognize, in the input image, a pattern from each of a plurality of pattern types, based on outputs of the first plurality of observers, each observer of the second plurality of observers being configured to recognize a different type of pattern; and
adding a new observer to the network of observers;
configuring the new observer to recognize a new pattern in the input image based on output of at least two observers of the second plurality of observers, wherein configuring the new observer includes, responsive to input from a user,
specifying a set of upstream observers from which the new observer is to receive input;
specifying a set of pattern filters using which the new observer is to process input from upstream observers,
specifying a location in the input image to which to initialize each of the pattern filters, and
selecting the size of a pattern filter based on a user selection of a subset of the image.

6. A processing system as recited in claim 5, wherein the set of operations further comprise:
teaching the new observer in response to a user input, by adjusting a set of weights used by the new observer in recognizing the new pattern in response to the user input.

7. An apparatus comprising:
a processor;
first logic to use a first plurality of observers in a network of observers, to identify a plurality of units, of an input image, that represent a feature;
second logic to use a second plurality of observers in the network of observers, to attempt to recognize, in the input image, a pattern from each of a plurality of pattern types, based on outputs of the first plurality of observers, each observer of the second plurality of observers being configured to recognize a different type of pattern; and
third logic to add a new observer to the network of observers;
fourth logic to configure the new observer to recognize a new pattern in the input image based on output of at least two observers of the second plurality of observers by, responsive to input from a user,
specifying a set of upstream observers from which the new observer is to receive input;
specifying a set of pattern filters using which the new observer is to process input from upstream observers,
specifying a location in the input image to which to initialize each of the pattern filters, and
selecting the size of a pattern filter based on a user selection of a subset of the image.

8. An apparatus as recited in claim 7, further comprising logic to configure the new observer to recognize the new pattern based on output of at least two observers of the second plurality of observers.

9. An apparatus as recited in claim 7, wherein the first logic identifies a plurality of units of an input image as potentially representing a feature by, for each of the plurality of units:
computing a measure of contrast for the unit; and
identifying the unit as potentially representing a feature based on the measure of contrast.

10. An apparatus as recited in claim 9, wherein the second logic attempts to recognize a pattern by:
using each of a plurality of weight patterns to integrate values for each of the identified units.

11. An apparatus as recited in claim 10, further comprising logic to configure the new observer, based on user input, by
specifying a set of upstream observers from which the new observer is to receive input;
specifying a set of pattern filters using which the new observer is to process input from upstream observers; and
specifying the size of a pattern filter based on a user selection of a subset of the image.

12. An apparatus as recited in claim 11, further comprising logic to teach the new observer in response to a user input, by adjusting a set of weights used by the new observer in recognizing the new pattern based on the user input.

* * * * *